United States Patent
Kim et al.

(10) Patent No.: US 10,932,249 B2
(45) Date of Patent: Feb. 23, 2021

(54) METHOD AND APPARATUS FOR TRANSMITTING DOWNLINK CONTROL INFORMATION IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Youngbum Kim, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/420,824

(22) Filed: May 23, 2019

(65) Prior Publication Data

US 2019/0297606 A1 Sep. 26, 2019

Related U.S. Application Data

(63) Continuation of application No. 16/363,637, filed on Mar. 25, 2019.

(30) Foreign Application Priority Data

Mar. 23, 2018 (KR) .................. 10-2018-0033718
Apr. 5, 2018 (KR) .................. 10-2018-0039915
(Continued)

(51) Int. Cl.
*H04W 4/00* (2018.01)
*H04W 72/04* (2009.01)
*H04L 5/00* (2006.01)

(52) U.S. Cl.
CPC ......... *H04W 72/042* (2013.01); *H04L 5/0039* (2013.01); *H04L 5/0053* (2013.01); *H04W 72/0453* (2013.01)

(58) Field of Classification Search
None
See application file for complete search history.

(56) References Cited

U.S. PATENT DOCUMENTS

2015/0078326 A1   3/2015   Kim et al.
2017/0064689 A1   3/2017   Nimbalker et al.
(Continued)

FOREIGN PATENT DOCUMENTS

KR   1020150035500   4/2015
KR   1020170095275   8/2017
WO   WO 2017/047875   3/2017

OTHER PUBLICATIONS

3GPP, 3rd Generation Partnership Project; Technical Specification Group Radio Access Network; NR; Physical Layer Procedures for Data (Release 15), 3GPP TS 38.214 V15.0.0, Dec. 2017, 71 pages.
(Continued)

*Primary Examiner* — Phuongchau Ba Nguyen
(74) *Attorney, Agent, or Firm* — The Farrell Law Firm, P.C.

(57) ABSTRACT

A method for receiving downlink control information (DCI) in a communication system is provided. The method includes identifying a starting resource block of the allocated resource associated with an active bandwidth part based on a starting resource block associated with the initial bandwidth part and a scaling parameter, when a size for the DCI of DCI format 1_0 in a user equipment (UE) specific search space (USS) is derived from a size of the initial bandwidth part and the DCI of DCI format 1_0 is applied to the active bandwidth part, and identifying a length of contiguously allocated resource blocks of the allocated resource associated with the active bandwidth part based on a length contiguously allocated resource blocks associated with the initial bandwidth part and the scaling parameter.

20 Claims, 15 Drawing Sheets

(30) Foreign Application Priority Data

Apr. 18, 2018 (KR) .......................... 10-2018-0044791
May 11, 2018 (KR) .......................... 10-2018-0054517

(56) References Cited

U.S. PATENT DOCUMENTS

| | | |
|---|---|---|
| 2017/0230947 A1 | 8/2017 | Liu et al. |
| 2017/0374569 A1 | 12/2017 | Lee et al. |
| 2018/0270854 A1 | 9/2018 | Lee et al. |
| 2019/0297606 A1* | 9/2019 | Kim ...................... H04L 5/0053 |
| 2019/0297607 A1* | 9/2019 | Kim ...................... H04L 5/0039 |

OTHER PUBLICATIONS

International Search Report dated Jul. 2, 2019 issued in counterpart application No. PCT/KR2019/003430, 7 pages.

\* cited by examiner

METHOD AND APPARATUS FOR TRANSMITTING DOWNLINK CONTROL INFORMATION IN WIRELESS COMMUNICATION SYSTEM

CROSS-REFERENCE TO RELATED APPLICATION(S)

This application is a Continuation Application of U.S. patent application Ser. No. 16/363,637, filed on Mar. 25, 2019 in the United States Patent and Trademark Office, and claims priority under 35 U.S.C. § 119 to Korean Patent Application Serial Nos. 10-2018-0033718, 10-2018-0039915, 10-2018-0044791, and 10-2018-0054517, filed on Mar. 23, 2018, Apr. 5, 2018, Apr. 18, 2018, and May 11, 2018, respectively, in the Korean Intellectual Property Office, entire disclosure of each of which is incorporated herein by reference.

BACKGROUND

1. Field

The present disclosure relates generally to a method and an apparatus for transmitting downlink control information in a wireless communication system.

2. Description of Related Art

To meet the demand for wireless data traffic having increased since deployment of $4^{th}$ Generation (4G) communication systems, efforts have been made to develop an improved 5th Generation (5G) or pre-5G communication system. Therefore, the 5G or pre-5G communication system may also referred to as a "beyond 4G network" or a "post long-term evolution (LTE) system". The 5G communication system is to be implemented in higher frequency (mmWave) bands (e.g., 60 GHz bands) in order to accomplish higher data rates. To decrease the propagation loss of radio waves and increase the transmission distance, beamforming, massive multiple-input multiple-output (MIMO), full dimensional MIMO (FD-MIMO), array antenna, analog beamforming, and large-scale antenna techniques are being discussed for use in 5G communication systems.

In addition, in 5G communication systems, development for system network improvement is underway based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as advanced coding modulation (ACM), and filter bank multi carrier (FBMC), non-orthogonal multiple access (NOMA), and sparse code multiple access (SCMA) as advanced access technologies have been developed.

Additionally, the Internet is now evolving to the Internet of things (IoT), wherein distributed entities, i.e., things, exchange and process information without human intervention. The Internet of everything (IoE), which is a combination of IoT technology and big data processing technology through connection with a cloud server, has also emerged.

As technology elements, such as "sensing technology", "wired/wireless communication and network infrastructure", "service interface technology", and "security technology" have been demanded for IoT implementation, a sensor network, machine-to-machine (M2M) communication, machine-type communication (MTC), and so forth have recently been researched. Such an IoT environment may provide intelligent Internet technology services that create a new value to human life by collecting and analyzing data generated by connected things. The IoT may be applied to a variety of fields including smart homes, smart buildings, smart cities, smart cars or connected cars, smart grids, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above described big data processing technology may also be considered to be as an example of convergence between the 5G technology and the IoT technology.

In a 5G system, the number of times of blind-decoding of a physical downlink control channel (PDCCH) by a terminal may be limited by the number of downlink control information (DCI) formats configured to be monitored, the number of PDCCH candidates, and the total number of control channel elements (CCEs) constituting a search space. Since multiple search space sets are monitored at a particular time point, there may occur a case in which the above described limiting condition fails to be satisfied, and a method for selecting (or dropping) only a particular PDCCH candidate in a pre-configured search space is needed in this situation.

In the 5G system, a size of a fallback DCI format may be determined by the size of an initial bandwidth part. In this example, if the size of a bandwidth part currently being activated is different from that of an initial bandwidth part, scheduling may be limited.

SUMMARY

The present disclosure has been made to address at least the disadvantages described above and to provide at least the advantages described below.

In accordance with an aspect of the present disclosure, a method of a terminal in a wireless communication system is provided. The method may include receiving DCI including frequency domain resource allocation information on a physical downlink control channel (PDCCH) from a base station, identifying an allocated resource for transmitting or receiving data based on the frequency domain resource allocation information, and transmitting or receiving the data on the allocated resource. When the frequency domain resource allocation information is based on a first bandwidth part of a first bandwidth and the DCI is for a second bandwidth part corresponding to a second bandwidth, the allocated resource is identified by applying a scaling factor based on the first bandwidth and the second bandwidth.

In accordance with an aspect of the present disclosure, a method of a base station in a wireless communication system is provided. The method may include generating DCI including frequency domain resource allocation information, the frequency domain resource allocation information indicating an allocated resource for transmitting or receiving data, transmitting the DCI on a PDCCH from a base station and transmitting or receiving the data on the allocated resource. When the frequency domain resource allocation information is based on a first bandwidth part of a first bandwidth and the DCI is for a second bandwidth part corresponding to a second bandwidth, the allocated resource is identified by applying a scaling factor based on the first bandwidth and the second bandwidth.

In accordance with an aspect of the present disclosure, a terminal in a wireless communication system is provided. The terminal may include a transceiver and a controller coupled with the transceiver. The controller may be configured to receive DCI including frequency domain resource allocation information on a PDCCH from a base station, identify an allocated resource for transmitting or receiving data based on the frequency domain resource allocation information, and transmit or receive the data on the allocated resource. When the frequency domain resource allocation information is based on a first bandwidth part of a first bandwidth and the DCI is for a second bandwidth part corresponding to a second bandwidth, the allocated resource is identified by applying a scaling factor based on the first bandwidth and the second bandwidth.

In accordance with an aspect of the present disclosure, a base station in a wireless communication system is provided. The base station may include a transceiver and a controller coupled with the transceiver. The controller may be configured to generate DCI including frequency domain resource allocation information, the frequency domain resource allocation information indicating an allocated resource for transmitting or receiving data, transmit the DCI on a physical downlink control channel (PDCCH) from a base station, and transmit or receive the data on the allocated resource. When the frequency domain resource allocation information is based on a first bandwidth of a first bandwidth part and the DCI is for a second bandwidth part corresponding to a second bandwidth, the allocated resource is identified by applying a scaling factor based on the first bandwidth and the second bandwidth.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
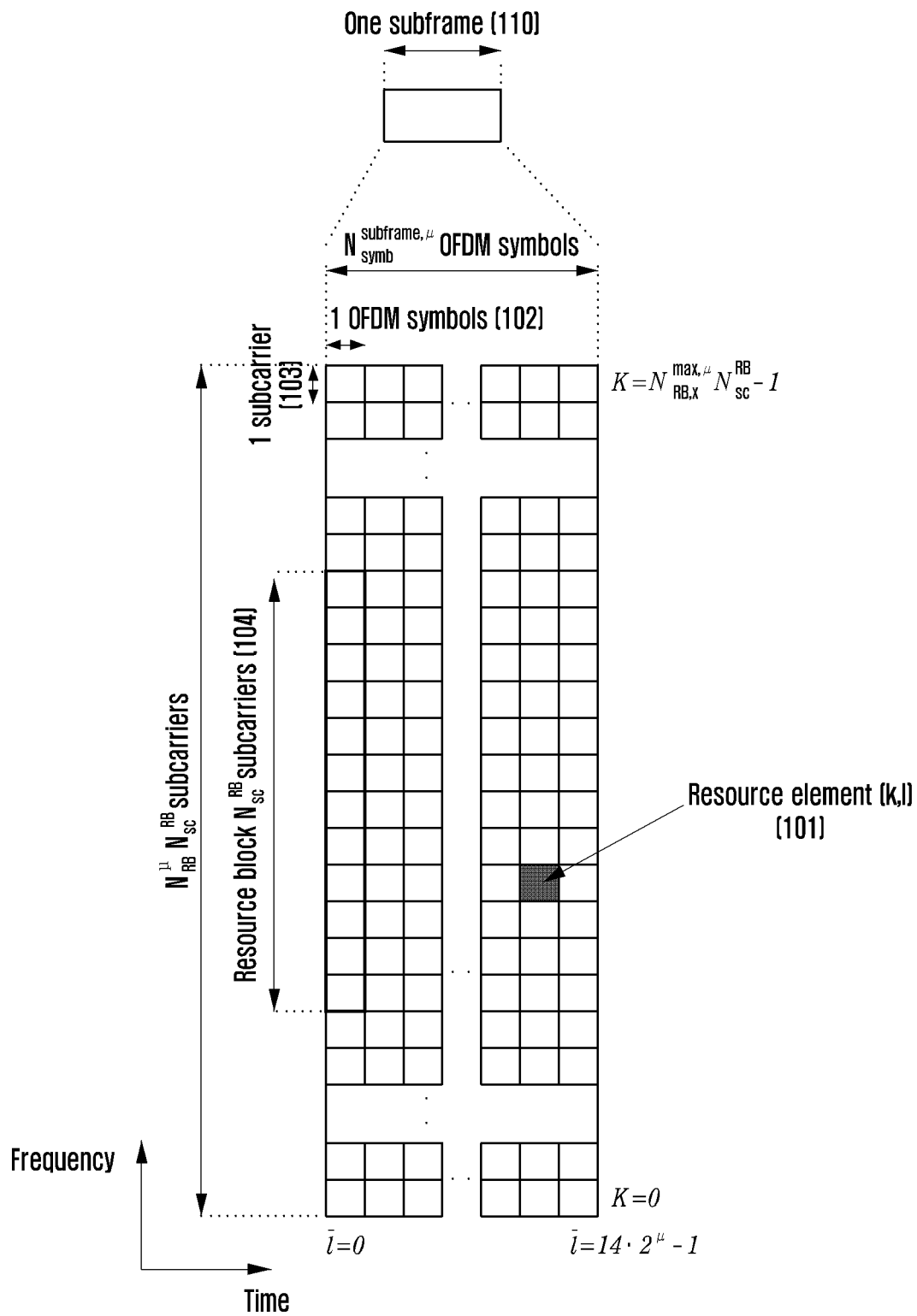
FIG. 1 is a diagram of a time-frequency domain in 5G, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicate different user devices regardless of the order or importance. For example, a first element may be referred to as a second element without departing from the scope the disclosure, and similarly, a second element may be referred to as a first element.

When an element (for example, a first element) is "(operatively or communicatively) coupled with/to" or "connected to" another element (for example, a second element), the element may be directly coupled with/to another element, and there may be an intervening element (for example, a third element) between the element and another element. However, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Herein, the term "unit" may refer to software or hardware elements, such as a field-programmable gate array (FPGA) and an ASIC, and the "unit" may perform any role. However, the meaning of "unit" is not limited to software or hardware. A "unit" may be configured to reside in a storage medium that may be addressed, and may also be configured to reproduce one or more processors. Accordingly, for example, a "unit" includes elements such as software elements, object-oriented software elements, class elements, and task elements; and processors, functions, attributes, procedures, subroutines, segments of program code, drivers, firmware, microcode, circuits, data, databases, data structures, tables, arrays, and variables. The functions provided in the elements and "units" may be combined with a smaller number of elements and "units" or may be further separated into additional elements and "units". In addition, the elements and the "units" may also be implemented to reproduce one or more CPUs within a device or a security multimedia card.

In the disclosure, the term "user" indicates a person using an electronic device or a device (e.g., an artificial intelligence electronic device) using an electronic device.

An embodiment implemented based on a 5G system is described below by way of example, but embodiments may be applied to other communication systems having a similar technical background or channel form. For example, LTE or LTE-A mobile communication and mobile communication technology, developed after 5G, may be included in other communication systems. Therefore, according to the determination of those skilled in the art, embodiments may be applied to other communication systems through partial modification without departing from the scope of the disclosure.

Further, in the following description of the disclosure, a detailed description of known functions or configurations incorporated herein will be omitted when the same may make the subject matter of the disclosure rather unclear. The terms which will be described below are defined in consideration of the functions in the disclosure, and may be different according to the intention or practice of users and operators. Therefore, the definitions of the terms should be made based on the contents throughout the specification.

A wireless communication system has been developed from a wireless communication system providing a voice-centered service in the early stage toward broadband wireless communication systems providing high-speed, high-quality packet data services compliant with communication standards, for example, high-speed packet access (HSPA), LTE or evolved universal terrestrial radio access (E-UTRA), LTE-advanced (LTE-A), and LTE-Pro of the 3rd Generation Partnership Project (3GPP), high-rate packet data (HRPD) and ultra-mobile broadband (UMB) of 3GPP2, 802.16e of Institute of Electrical and Electronics Engineers (IEEE), etc.

As a representative example of broadband wireless communication systems, an LTE system adopts an orthogonal frequency division multiplexing (OFDM) scheme in a downlink (DL), and adopts a single carrier frequency division multiple access (SC-FDMA) scheme in an uplink (UL). The "uplink" refers to a radio link through which a terminal (a user equipment (UE) or a mobile station (MS)) transmits data or a control signal to a base station (BS) (or an eNodeB), and the "downlink" refers to a radio link through which a base station transmits data or a control signal to a terminal. The above described multiple access scheme normally allocates and operates time-frequency resources, which carry data or control information to be transmitted according to users, so as to prevent the time-frequency resources from overlapping each other (e.g., establish orthogonality), thus making it possible to distinguish the data or control information of one user from another.

As a future communication system since the LTE (e.g., a 5G communication system) should be able to freely reflect various requirements such as a user and a service provider, and thus a service, which satisfies various requirements together, needs to be supported. The services considered for the 5G communication system include enhanced mobile broadband (eMBB), massive machine-type communication (mMTC), ultra-reliability low-latency communication (URLLC), etc.

The eMBB aims to provide a higher data transfer rate than a data transfer rate supported by the existing LTE, LTE-A, or LTE-Pro. For example, in the 5G communication system, the eMBB should be able to provide a peak data rate of 20 Gbps in the downlink and a peak data rate of 10 Gbps in the uplink from the perspective of one base station. Also, the 5G communication system has to provide an increased user perceived data rate of a terminal simultaneously with providing the peak data rate. In order to satisfy these requirements, an improvement in various transmitting and receiving technologies, including a further improved multi-input multi-output (MIMO) transmission technology is required. In the current LTE, signals are transmitted using the transmission bandwidth of up to 20 MHz in the used 2 GHz band, whereas the 5G communication system uses a bandwidth wider than 20 MHz in the frequency band of 3 to 6 GHz or more than 6 GHz, and thus can satisfy the data transmission rate required in the 5G communication system.

In addition, the mMTC is being considered to support application services such as IoT in the 5G communication system. The mMTC is required for access support for a large-scale terminal in a cell, coverage enhancement in a terminal, improved battery time, and cost reduction of a terminal in order to efficiently provide the Internet of things. Since the IoT is attached to various sensors and various devices so as to provide a communication function, the IoT should be able to support a large number of terminals (e.g., 1,000,000 terminals/km2) in a cell. Also, the terminals supporting the mMTC are more likely to be located in shaded areas that a cell fails to cover, such as an underground of building due to the nature of services, and thus requires a wider coverage than other services provided by the 5G communication system. The terminals supporting the mMTC should be configured as inexpensive terminals and require very long battery life time, e.g., 10 to 15 years, because it is difficult to frequently replace the battery of the terminal.

The URLLC is a cellular-based wireless communication service used for mission-critical purposes. For example, services used for a remote control for a robot or machinery, industrial automation, unmanaged aerial vehicle, remote health care, emergency alert, etc., may be considered. Therefore, the communication provided by the URLLC should provide very low latency and very high reliability. For example, a service which supports URLLC should meet air interface latency of less than 0.5 milliseconds, and at the same time, have requirements of a packet error rate less than $10^{-5}$. Therefore, for the service that supports the URLLC, the 5G system should provide a transmit time interval (TTI) smaller than other services, and at the same time, design matters for allocating a wide resource in a frequency band in order to ensure the reliability of a communication link are required.

The three services considered for the 5G communication system (e.g., the eMBB, the URLLC, and the mMTC) may be multiplexed and transmitted in one system. In this configuration, in order to meet different requirements that the respective services have, it is possible to use different transmission/reception techniques and different transmission/reception parameters between the services.

FIG. 1 is a diagram of a basic structure of a time-frequency domain (e.g., a radio resource domain) in which data or a control channel is transmitted in a 5G system, according to an embodiment.

Referring to FIG. 1, the horizontal axis represents the time domain and the vertical axis represents the frequency domain. A basic unit of resources in the time and frequency domain is a resource element (RE) 101, and may be defined by one OFDM symbol 102 on the time axis and one subcarrier 103 on the frequency axis. In the frequency domain, $N_{SC}^{RB}$ (e.g., 12) consecutive REs may constitute one resource block (RB) 104. In the time domain, $N_{symb}^{subframe}$ consecutive symbol REs may constitute one subframe 110.

Figure 2:
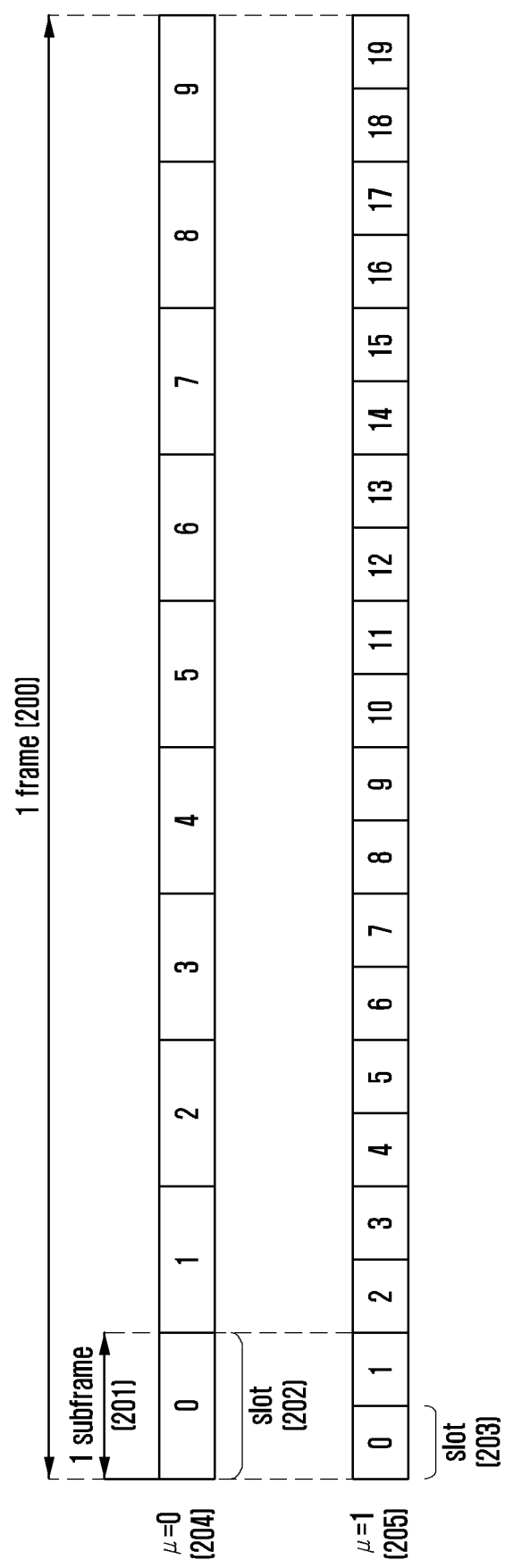
FIG. 2 is a diagram of a structure of a frame, a subframe, and a slot in 5G, according to an embodiment.

FIG. 2 is a diagram of a structure of a frame, a subframe, and a slot in 5G, according to an embodiment.

FIG. 2 illustrates an example of a structure of a frame 200, a subframe 201, and a slot 202. One frame 200 may be defined as 10 ms. One subframe 201 may be defined as 1 ms, and thus one frame 200 may include a total of 10 subframes 201. One slot 202 or 203 may include 14 OFDM symbols (i.e., $N_{symb}^{slot}$, which represents the number of symbols per slot, =14). One subframe 201 may include one or more slots 202 or 203, and the number of slots 202 or 203 per subframe 201 may be changed according to μ 204 or 205 representing a set value of a subcarrier spacing. FIG. 2 illustrates a case in which μ=0 for a set value of a subcarrier spacing (as indicated by reference numeral 204) and a case in which μ=1 for a set value of a subcarrier spacing (as indicated by reference numeral 205). If μ=0 (as indicated by reference numeral 204), one subframe 201 may include one slot 202. If μ=1 (as indicated by reference numeral 205), one subframe 201 may include two slots 203. That is, $N_{slot}^{subframe,\mu}$, which represents the number of slots per subframe, may be changed according to a set value μ of a subcarrier spacing, and thus $N_{slot}^{frame,\mu}$, which represents the number of slots per frame, may be changed. $N_{slot}^{subframe,\mu}$ and $N_{slot}^{frame,\mu}$ according to a set value μ of a subcarrier spacing may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G system, scheduling information for uplink data (or a physical uplink shared channel (PUSCH)) or downlink data (or a physical downlink shared channel (PDSCH)) is delivered from a base station to a terminal through DCI. The terminal may monitor a fallback DCI format and a non-fallback DCI format for a PUSCH or a PDSCH. A fallback DCI format may include a fixed field predefined between the base station and the terminal, and a non-fallback DCI format may include a configurable field.

The DCI may pass through a channel coding and modulation process and may then be transmitted through a physical downlink control channel (PDCCH). A cyclic redundancy check (CRC) is attached to a payload of a DCI message, and the CRC is scrambled by a radio network temporary identifier (RNTI) corresponding to identity of the terminal. Different RNTIs are used depending on the purpose of the DCI message (e.g., UE-specific data transmission, power control command, or random access response). The RNTI is not explicitly transmitted but is transmitted by being included in a CRC calculation process.

Upon receiving the DCI message transmitted on the PDCCH, the terminal checks the CRC by using the allocated RNTI. If the check result of the CRC is correct, it can be seen that the corresponding message is transmitted to the terminal.

DCI for scheduling a PDSCH for system information (SI) may be scrambled with a system information RNTI (SI-RNTI). DCI for scheduling a PDSCH for a random access response (RAR) message may be scrambled with a random access RNTI (RA-RNTI). DCI for scheduling a PDSCH for a paging message may be scrambled with a paging RNTI (P-RNTI). DCI which provides notification of a slot format indicator (SFI) may be scrambled with a slot format indicator RNTI (SFI-RNTI). DCI which provides notification of transmit power control (TPC) may be scrambled with a transmit power control RNTI (TPC-RNTI). DCI for scheduling a UE-specific PDSCH or PUSCH may be scrambled with a cell RNTI (C-RNTI).

A DCI format 0_0 may be used as fallback DCI for scheduling a PUSCH, and a CRC may be scrambled by a C-RNTI in this example. The DCI format 0_0, the CRC of which is scrambled by the C-RNTI, may include the following pieces of information as shown in Table 2.

TABLE 2

Identifier for DCI formats - [1] bit
Frequency domain resource assignment - $[\lceil \log_2(N_{RB}^{UL,BWP}(N_{RB}^{UL,BWP} + 1)/2) \rceil]$ bits
Time domain resource assignment - X bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - [2] bits
UL/supplementary UL (SUL) indicator - 0 or 1 bit A DCI format 0_1 may be used as non-fallback DCI for scheduling a PUSCH, and a CRC may be scrambled by a C-RNTI in this example. The DCI format 0_1, the CRC of which is scrambled by the C-RNTI, may include the following pieces of information as shown in Table 3.

TABLE 3

Carrier indicator — 0 or 3 bits
UL/SUL indicator — 0 or 1 bit
Identifier for DCI formats — [1] bits
Bandwidth part indicator — 0, 1, or 2 bits
Frequency domain resource assignment
• For resource allocation type 0, $\lceil N_{RB}^{UL,BWP}/P \rceil$ bits
• For resource allocation type 1, $\lceil \log_2(N_{RB}^{UL,BWP}(N_{RB}^{UL,BWP} + 1)/2) \rceil$ bits
Time domain resource assignment — 1, 2, 3, or 4 bits
Virtual resource block (VRB)-to-physical resource block (PRB) mapping —
0 or 1 bit, only for resource allocation type 1.
• 0 bit if only resource allocation type 0 is configured;
• 1 bit otherwise.
Frequency hopping flag — 0 or 1 bit, only for resource allocation type 1.
• 0 bit if only resource allocation type 0 is configured;
• 1 bit otherwise.
Modulation and coding scheme — 5 bits
New data indicator — 1 bit
Redundancy version — 2 bits
HARQ process number — 4 bits
1st downlink assignment index— 1 or 2 bits
• 1 bit for semi-static HARQ-ACK codebook;
• 2 bits for dynamic HARQ-ACK codebook with single HARQ-ACK codebook.
2nd downlink assignment index — 0 or 2 bits
• 2 bits for dynamic HARQ-ACK codebook with two HARQ-ACK
sub-codebooks;
• 0 bit otherwise.
TPC command for scheduled PUSCH — 2 bits
•

$$SRS \text{ resource indicator } - \left\lceil \log_2\left(\sum_{k=1}^{L_{max}} \binom{N_{SRS}}{k}\right) \right\rceil \text{ or } \lceil \log_2(N_{SRS}) \rceil \text{ bits}$$

TABLE 3-continued

- $\left\lceil \log_2\left(\sum_{k=1}^{L_{max}} \binom{N_{SRS}}{k}\right) \right\rceil$ bits for non-codebook-based *PUSCH* transmission;
- $\lceil \log_2(N_{SRS}) \rceil$ bits for codebook-based PUSCH transmission.
- Precoding information and number of layers — up to 6 bits
- Antenna ports — up to 5 bits
- SRS request — 2 bits
- CSI request — 0, 1, 2, 3, 4, 5, or 6 bits
- Code block group (CBG) transmission information — 0, 2, 4, 6, or 8 bits
- PTRS-DMRS association — 0 or 2 bits.
- beta_offset indicator — 0 or 2 bits
- DMRS sequence initialization — 0 or 1 bit A DCI format 1_0 may be used as fallback DCI for scheduling a PDSCH, and a CRC may be scrambled by a C-RNTI in this example. The DCI format 1_0, the CRC of which is scrambled by the C-RNTI, may include the following pieces of information as shown in Table 4.

TABLE 4

Identifier for DCI formats - [1] bit
Frequency domain resource assignment - $\lceil \log_2(N_{RB}^{DL,BWP}(N_{RB}^{DL,BWP} + 1)/2) \rceil$ bits
Time domain resource assignment - X bits
VRB-to-PRB mapping - 1 bit.
Modulation and coding scheme - 5 bits

TABLE 4-continued

New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits A DCI format 1_1 may be used as non-fallback DCI for scheduling a PDSCH, and a CRC may be scrambled by a C-RNTI in this example. The DCI format 1_1, the CRC of which is scrambled by the C-RNTI, may include the following pieces of information as shown in Table 5.

TABLE 5

Carrier indicator - 0 or 3 bits
Identifier for DCI formats - [1] bits
Bandwidth part indicator - 0, 1, or 2 bits
Frequency domain resource assignment
- For resource allocation type 0, $\lceil N_{RB}^{DL,BWP}/P \rceil$ bits
- For resource allocation type 1, $\lceil \log_2(N_{RB}^{DL,BWP}(N_{RB}^{DL,BWP} + 1)/2) \rceil$ bits Time domain resource assignment - 1, 2, 3, or 4 bits
VRB-to-PRB mapping - 0 or 1 bit, only for resource allocation type 1.
- 0 bit if only resource allocation type 0 is configured;
- 1 bit otherwise.

Figure 3:
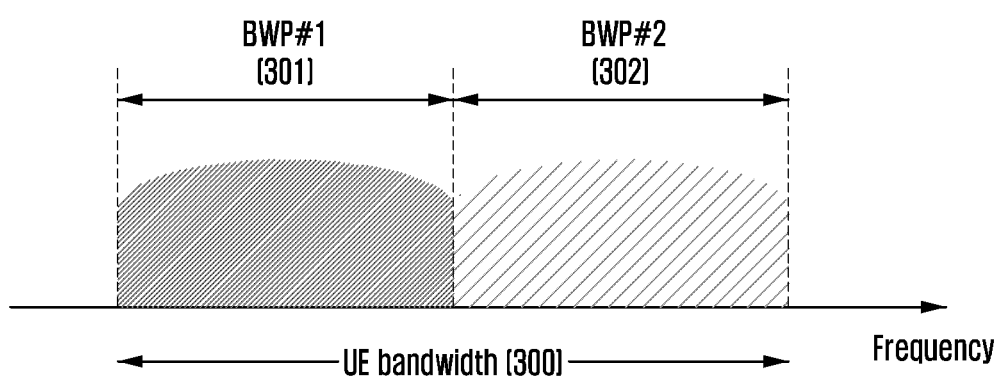
FIG. 3 is a diagram of an example of configuration of a bandwidth part in 5G, according to an embodiment.

PRB bundling size indicator - 0 or 1 bit
Rate matching indicator - 0, 1, or 2 bits
Zero power (ZP) CSI-RS trigger - 0, 1, or 2 bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0, 2, or 4 bits
TPC command for scheduled PUCCH - 2 bits
PUCCH resource indicator - 3 bits
PDSCH-to-HARQ_feedback timing indicator - 3 bits
Antenna ports - 4, 5, or 6 bits
Transmission configuration indication - 0 or 3 bits
SRS request - 2 bits
CBG transmission information - 0, 2, 4, 6, or 8 bits
CBG flushing out information - 0 or 1 bit
DMRS sequence initialization - 1 bit FIG. 3 is a diagram of an example of configuration of a bandwidth part in 5G, according to an embodiment. More specifically, FIG. 3 illustrates an example in which a terminal bandwidth 300 includes two bandwidth parts (e.g., a bandwidth part #1 301 and a bandwidth part #2 302). A base station may configure one or more bandwidth parts for a terminal, and may configure the following pieces of information (e.g., at least one of a bandwidth part identifier, a bandwidth part location, a subcarrier spacing, and a cyclic prefix) for each bandwidth part as shown in Table 6.

TABLE 6

| | |
|---|---|
| BWP ::= | SEQUENCE { |
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

In addition to the above described pieces of configuration information, various parameters related to a bandwidth part may be configured for the terminal. The base station may deliver the above described pieces of information to the terminal through higher layer signaling, such as radio resource control (RRC) signaling. At least one bandwidth part among the one or more configured bandwidth parts may be activated. Whether the configured bandwidth part is activated may be semi-statically delivered from the base station to the terminal through RRC signaling, or may be dynamically delivered from the base station to the terminal through a medium access control (MAC) control element (CE) or DCI.

The configuration of a bandwidth part supported by the 5G system may be used for various purposes.

If a bandwidth supported by the terminal is smaller than a system bandwidth, the above described configuration of a bandwidth part may provide support. A frequency location (configuration information 2) of a bandwidth part is configured for the terminal as shown in Table 4, and thus the terminal can transmit or receive data at a particular frequency location in the system bandwidth.

In order to support different numerologies, the base station may configure multiple bandwidth parts for the terminal. In order to provide any terminal with support for transmissions/receptions of data using both a subcarrier spacing of 15 kHz and a subcarrier spacing of 30 kHz, two bandwidth parts may be configured with the subcarrier spacing of 15 kHz and the subcarrier spacing of 30 kHz, respectively. The different bandwidth parts may be frequency-division-multiplexed, and if data is to be transmitted or received with a particular subcarrier spacing, a bandwidth part configured with the relevant subcarrier spacing may be activated.

In order to reduce power consumed by the terminal, the base station may configure bandwidth parts having different bandwidths for the terminal. If the terminal supports very large bandwidth, such as a bandwidth of 100 MHz, and always transmits or receives data in the relevant bandwidth, very large power consumption may be caused. Particularly, in a situation where there is no traffic, execution of unnecessary monitoring of a downlink control channel in a large bandwidth such as 100 MHz is very inefficient from the perspective of power consumption. In order to reduce power consumed by the terminal, the base station may configure a bandwidth part having a relatively small bandwidth, such as a bandwidth of 20 MHz, for the terminal.

When there is no traffic, the terminal may perform a monitoring operation in the bandwidth part having the bandwidth of 20 MHz, and if data is generated, may transmit or receive data in the bandwidth part having the bandwidth of 100 MHz according to an instruction of the base station.

In the above described method for configuring a bandwidth part, terminals before being RRC-connected may receive configuration information on an initial bandwidth part through a master information block (MIB) at an initial access stage. More specifically, the terminal may receive, from a MIB of a physical broadcast channel (PBCH), configuration of a control resource set (CORESET) for a downlink control channel through which DCI for scheduling a system information block (SIB) can be transmitted. A bandwidth of the CORESET configured through the MIB may be regarded as an initial bandwidth part, and the terminal may receive a PDSCH, through which an SIB is transmitted, in the configured initial bandwidth part. The initial bandwidth part may be used to receive an SIB, and may also be utilized for other system information (OSI), paging, and random access.

Figure 4:
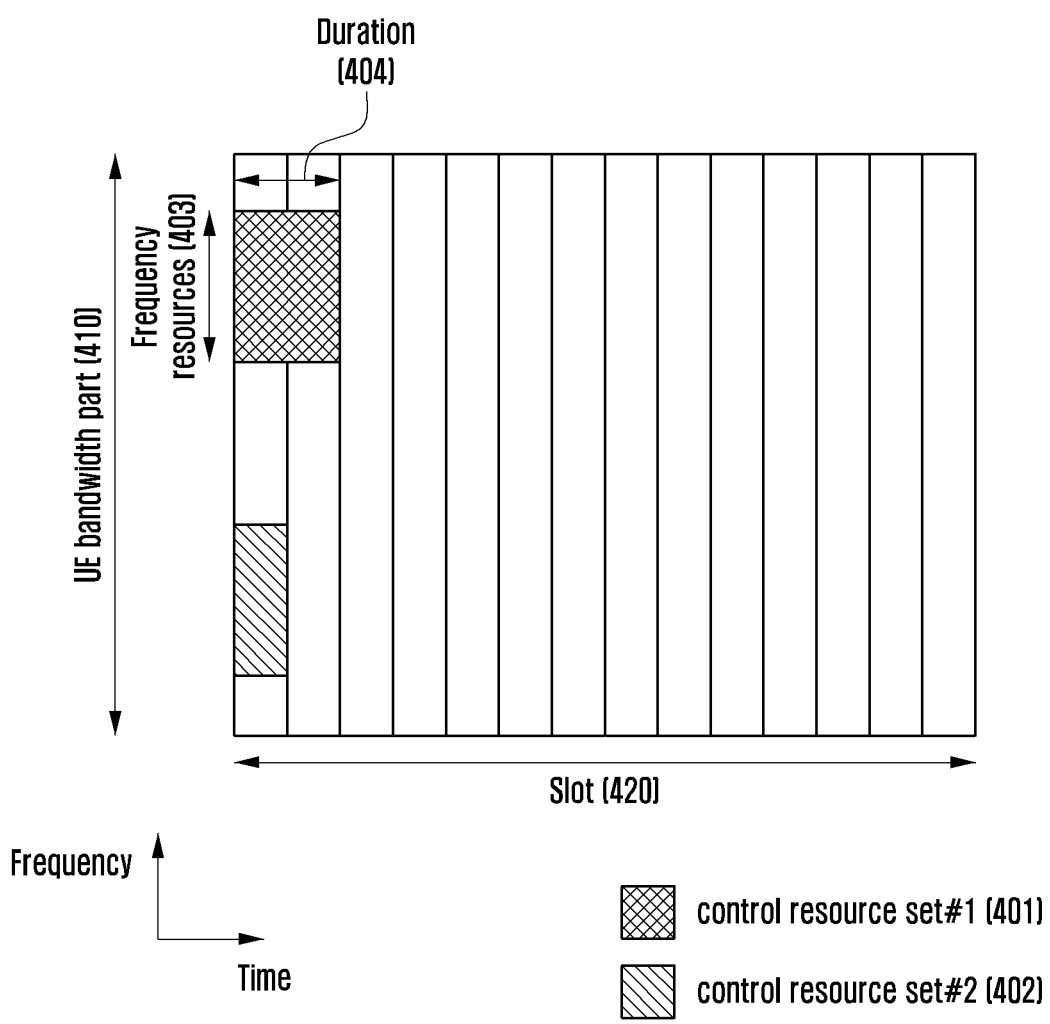
FIG. 4 is a diagram of an example of configuration of a control resource set of a downlink control channel in 5G, according to an embodiment.

FIG. 4 is a diagram of a control resource set (CORESET) for transmission of a downlink control channel in a 5G wireless communication system, according to an embodiment. More specifically, FIG. 4 illustrates an example in which a terminal bandwidth part 410 is configured on the frequency axis and two CORESETs (a CORESET #1 401 and a CORESET #2 402) are configured in one slot 420 on the time axis. The CORESETs 401 and 402 may be configured in a particular frequency resource 403 in the entire terminal bandwidth part 410 on the frequency axis. The CORESETs 401 and 402 may be configured as one or more OFDM symbols on the time axis, which may be defined as a CORESET duration 404. In FIG. 4, the CORESET #1 401 is configured as a CORESET duration of two symbols, and the CORESET #2 402 is configured as a CORESET duration of one symbol.

The above described CORESET in the 5G system may be configured for the terminal through higher layer signaling (e.g., system information, a MIB, or RRC signaling) by the base station. The configuration of a CORESET for the terminal signifies provision of at least one of a CORESET identity, a frequency location of a CORESET, and a symbol duration of a CORESET. Examples of CORESET configuration information may include the following pieces of information as shown in Table 7 (at least one piece of information among CORESET identity, frequency-axis resource allocation information, time-axis resource allocation information, mapping type, resource element group (REG) bundle size, interleaver size, interleaver shift, and QCL configuration information).

TABLE 7

```
ControlResourceSet ::=                    SEQUENCE {
    -- Corresponds to L1 parameter 'CORESET-ID'
        controlResourceSetId              ControlResourceSetId,
    (control resource set identity)
        frequencyDomainResources          BIT STRING (SIZE (45)),
    (frequency-axis resource allocation information)
        duration                          INTEGER
(1..maxCoReSetDuration),
    (time-axis resource allocation information)
        cce-REG-MappingType               CHOICE {
    (CCE-to-REG mapping type)
            interleaved
        SEQUENCE {
            reg-BundleSize
        ENUMERATED {n2, n3, n6},
          (REG bundle size)
            precoderGranularity
        ENUMERATED {sameAsREG-bundle, allContiguousRBs},
            interleaverSize
        ENUMERATED {n2, n3, n6}
            (interleaver size)
            shiftIndex
        INTEGER(0..maxNrofPhysicalResourceBlocks-1)
                OPTIONAL
            (interleaver shift)
    },
        nonInterleaved                    NULL
    },
    tci-StatesPDCCH
    SEQUENCE(SIZE (1..maxNrofTCI-StatesPDCCH)) OF TCI-StateId
            OPTIONAL,
    (QCL configuration information)
        tci-PresentInDCI                  ENUMERATED
{enabled}                                 }
```

Figure 5:
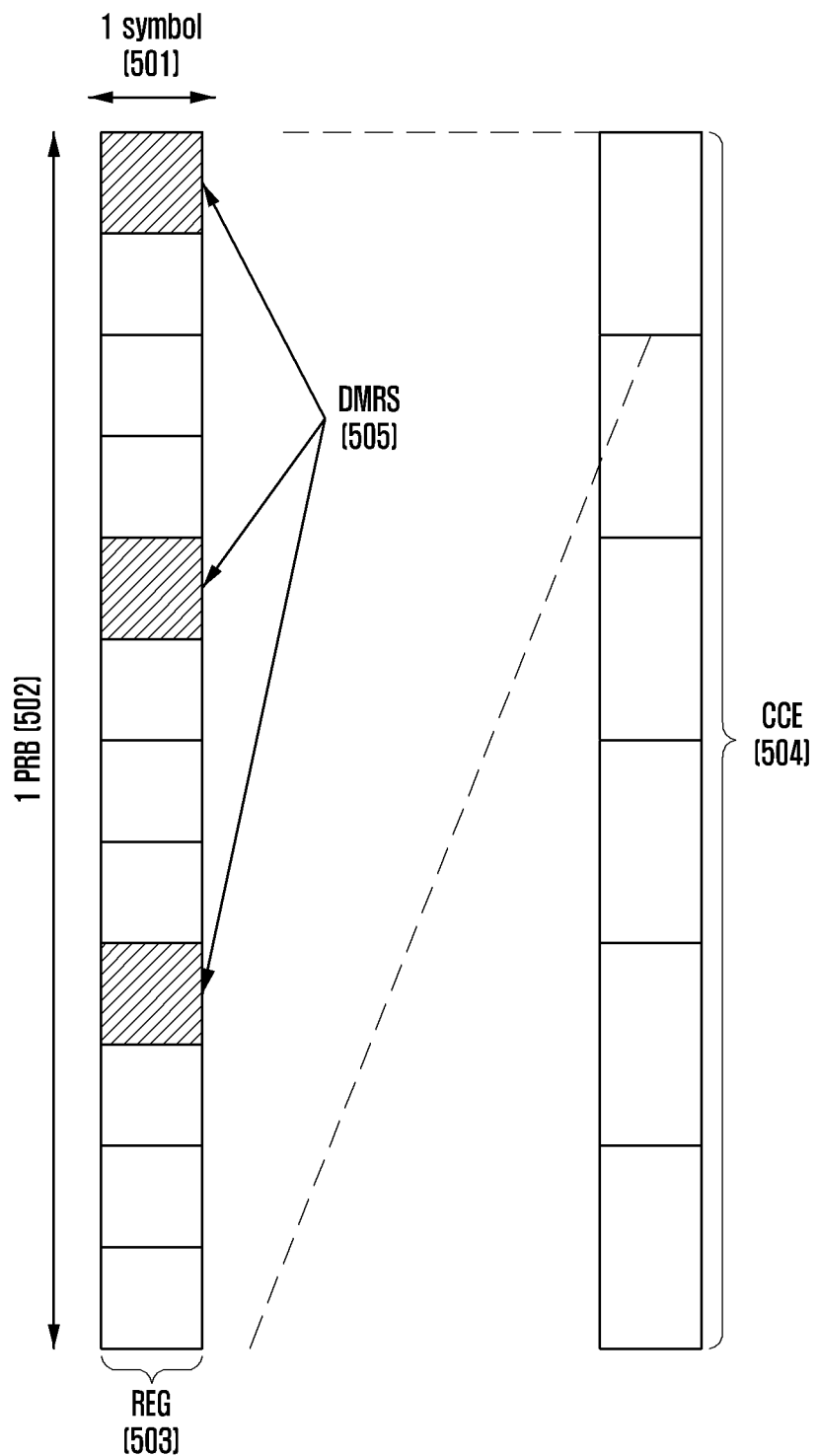
FIG. 5 is a diagram of a structure of a downlink control channel in 5G, according to an embodiment.

FIG. 5 is a diagram of a basic unit of time and frequency resources constituting a downlink control channel usable in a 5G system, according to an embodiment.

Referring to FIG. 5, a basic unit of time and frequency resources constituting a control channel is named "REG" 503, wherein the REG 503 may be defined as one OFDM symbol 501 on the time axis and may be defined as 1 PRB 502 (e.g., 12 subcarriers) on the frequency axis. A downlink control channel allocation unit may be configured by concatenating the REGs 503.

If a basic unit, in which a downlink control channel is allocated, is a control channel element (CCE) 504 in the 5G system, one CCE 504 may include multiple REGs 503. In the REG 503, the REG 503 may include 12 REs, and if one CCE 504 includes six REGs 503, the one CCE 504 may include 72 REs. If a downlink CORESET is configured, the relevant downlink CORESET may include multiple CCEs 504, and a particular downlink control channel may be mapped to one or more CCEs 504 according to aggregation levels (ALs) in the CORESET, and the downlink control channel mapped to the one or more CCEs 504 may be transmitted. The CCEs 504 in the CORESET are distinguished by numbers, and the numbers may be assigned according to a logical mapping scheme.

A basic unit (e.g., the REG 503), of a downlink control channel illustrated in FIG. 5 may include REs, to which DCI is mapped, and all regions in which demodulation reference signals (DMRSs) 505, which are reference signals for decoding of the REGs, are mapped. As illustrated in FIG. 5, the three DMRSs 505 may be transmitted in the one REG 503.

The numbers of CCEs used to transmit a PDCCH may be 1, 2, 4, 8, and 16 according to the ALs, and the different numbers of CCEs may be used to implement link adaptation of a downlink control channel. If AL=L, one downlink control channel may be transmitted through L CCEs. A terminal should detect a signal in a state in which the terminal does not know information on a downlink control channel, and a search space representing a set of CCEs is defined for blind-decoding. Since a search space is a set of control channel candidates including CCEs that the terminal should attempt to decode at a given AL and there are multiple ALs which make respective groups from 1, 2, 4, 8, and 16 CCEs into respective groups, the terminal has multiple search spaces. A search space set may be defined as a set of search spaces at all configured ALs.

Search spaces may be classified into a common search space and a UE-specific search space. A specific group of terminals or all terminals may search (blind-decode) a common search space of a PDCCH in order to receive dynamic scheduling for system information or cell-common control information such as a paging message. PDSCH scheduling allocation information for transmission of an SIB including operator information and the like of a cell blind-decode may be received through blind-decoding of a common search space of a PDCCH. Since a specific group of terminals or all terminals should receive a PDCCH, a common search space may be defined as a set of pre-agreed CCEs. Scheduling allocation information on a UE-specific PDSCH or PUSCH may be received through blind-decoding a UE-specific search space of a PDCCH. A UE-specific search space is a function of an identity of a terminal and various system parameters, and may be defined to be UE-specific.

In the 5G system, a parameter of a search space for a PDCCH may be configured for the terminal by the base station through higher layer signaling (e.g., SIB, MIB, or RRC signaling). The base station may configure, for the terminal, at least one piece of information among the number of PDCCH candidates at each aggregation level L, a cycle for monitoring of a search space, occasion of monitoring of a search space in the unit of symbol in a slot, search space type (common search space or UE-specific search space), a combination of an RNTI and a DCI format to be monitored in a relevant search space, and an index of a CORESET in which a search space is to be monitored.

Examples of the information configured for the terminal by the base station may include the following pieces of information in Table 8 (at least one piece of information among search space identity, CORESET identity, monitoring slot level periodicity, monitoring symbol in a slot, the number of PDCCH candidates for each AL, and search space type).

TABLE 8

```
SearchSpace ::=                              SEQUENCE {
       -- Identity of the search space. SearchSpaceId = 0 identifies the SearchSpace configured
via PBCH (MIB) or ServingCellConfigCommon.
          searchSpaceId                      SearchSpaceId,
       (search space identity)
          controlResourceSetId               ControlResourceSetId,
       (control resource set identity)
          monitoringSlotPeriodicityAndOffset  CHOICE {
       (monitoring slot level periodicity)
             sl1
          NULL,
             sl2
          INTEGER (0..1),
             sl4
          INTEGER (0..3),
             sl5
          INTEGER (0..4),
             sl8
          INTEGER (0..7),
             sl10
          INTEGER (0..9),
             sl16
          INTEGER (0..15),
             sl20
          INTEGER (0..19)
          }
                                             OPTIONAL,
          monitoringSymbolsWithinSlot        BIT STRING (SIZE
(14))
             OPTIONAL,
       (monitoring symbol in slot)
          nrofCandidates                     SEQUENCE {
       (number of PDCCH candidates for each aggregation level)
             aggregationLevel1
          ENUMERATED {n0, n1, n2, n3, n4, n5, n6, n8},
             aggregationLevel2
          ENUMERATED {n0, n1, n2, n3, n4, n5, n6, n8},
             aggregationLevel4
          ENUMERATED {n0, n1, n2, n3, n4, n5, n6, n8},
             aggregationLevel8
          ENUMERATED {n0, n1, n2, n3, n4, n5, n6, n8},
             aggregationLevel 16
          ENUMERATED {n0, n1, n2, n3, n4, n5, n6, n8}
          },
          searchSpaceType                    CHOICE {
       (search space type)
             -- Configures this search space as common search space (CSS) and DCI formats
to monitor.
             common
          SEQUENCE {
       (common search space)
          }
             ue-Specific
          SEQUENCE {
       (UE-specific search space)
             -- Indicates whether the UE monitors in this USS for DCI formats 0-0
and 1-0 or for formats 0-1 and 1-1.
             formats
          ENUMERATED {formats0-0-And-1-0, formats0-1-And-1-1},
             ...
          }
```

The base station may configure one or more search space sets for the terminal according to the configuration information. The base station may configure a search space set 1 and a search space set 2 for the terminal, may configure the terminal so as to monitor a DCI format A, scrambled with an X-RNTI in the search space set 1, in a common search space, and may configure the terminal so as to monitor a DCI format B, scrambled with a Y-RNTI in the search space set 2, in a UE-specific search space.

According to the above described configuration information, one or more search space sets may exist in a common search space or a UE-specific search space. Search space set #1 and search space set #2 may be configured as a common search space, and search space set #3 and search space set #4 may be configured as a UE-specific search space.

The following combination of a DCI format and an RNTI may be monitored in a common search space.

DCI format 0_0/1_0 with CRC scrambled by cell-RNTI (C-RNTI), configured scheduling RNTI (CS-RNTI), semi-persistent (SP)-CSI-RNTI, random access RNTI (RA-RNTI), temporary cell RNTI (TC-RNTI), paging RNTI (P-RNTI), system information RNTI (SI-RNTI);

DCI format 2_0 with CRC scrambled by a slot format indicator (SFI)-RNTI

DCI format 2_1 with CRC scrambled by interruption RNTI (INT-RNTI);

DCI format 2_2 with CRC scrambled by transmit power control for PUSCH RNTI (TPC-PUSCH-RNTI), transmit power control for PUCCH RNTI (TPC-PUCCH-RNTI);

DCI format 2_3 with CRC scrambled by transmit power control for SRS RNTI (TPC-SRS-RNTI);

The following combination of a DCI format and an RNTI may be monitored in a UE-specific search space.

DCI format 0_0/1_0 with CRC scrambled by C-RNTI, CS-RNTI, TC-RNTI;

DCI format 1_0/1_1 with CRC scrambled by C-RNTI, CS-RNTI, TC-RNTI.

The above specified RNTIs may comply with the following definition and uses.

C-RNTI: use for scheduling UE-specific PDSCH;
TC-RNTI: use for scheduling UE-specific PDSCH;
CS-RNTI: use for semi-statically configured UE-specific PDSCH scheduling;
RA-RNTI: use for scheduling PDSCH at random access stage;
P-RNTI: use for scheduling of PDSCH for transmitting paging
SI-RNTI: use for scheduling of PDSCH for transmitting system information;
INT-RNTI: use for providing notification of whether PDSCH is punctured;
TPC-PUSCH-RNTI: use for indicating power control command for PUSCH;
TPC-PUCCH-RNTI: use for indicating power control command for PUCCH;
TPC-SRS-RNTI: use for indicating power control command for SRS.

The above specified DCI formats may comply with the following definitions in Table 9.

TABLE 9

| DCI format | Use |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, a search space at an aggregation level L in a CORESET p and a search space set s may be expressed by Equation (1) below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad (1)$$

In Equation (1) L represents aggregation level, $n_{CI}$ represents carrier index, $N_{CCE,p}$ represents the total number of CCEs existing in a CORESET p, $n_{s,f}^\mu$ represents slot index, $M_{p,s,max}^{(L)}$ represents the number of PDCCH candidates at an aggregation level L, $m_{s,n_{CI}}=0, \ldots, M_{p,s,max}^{(L)}-1$ represents an index of a PDCCH candidate at an aggregation level L, $i=0, \ldots, L-1$; $Y_{p,n_{s,f}^\mu}=(A_p \cdot Y_{p,n_{s,f}^\mu-1})$ modD, $Y_{p,-1}=n_{RNTI}\neq 0, A_0=39827, A_1=39829, A_2=39839,$ and $D=65537$, and $n_{RNTI}$ represents terminal identify.

A value of $Y\_(p, n_{s,f}^\mu)$ may correspond to 0 in the case of a common search space.

A value of $Y\_(p, n_{s,f}^\mu)$ may correspond to a value changed according to an identity of a terminal (a C-RNTI or an ID configured for the terminal by a base station) and a time index, in the case of a UE-specific search space.

First Embodiment

In the 5G system, multiple search space sets may be configured to have different parameters (e.g., the parameters in Table 8). Accordingly, groups of search space sets monitored by the terminal may become different according to time points. If search space set #1 is configured at intervals of an X-slot cycle, search space set #2 is configured at intervals of a Y-slot cycle, and X is different from Y, a terminal may monitor both search space set #1 and search space set #2 in a particular slot, and may monitor either search space set #1 or search space set #2 in a particular slot.

In the 5G system, a method for determining the maximum number of times of blind-decoding of a PDCCH by a terminal may consider the following conditions.

[Condition 1]
The number of DCI formats having different sizes monitored per slot does not exceed X. X may be, for example, 4 or 5.

[Condition 2]
The number of DCI formats, which have different sizes and each of which a CRC is scrambled by a C-RNTI, among pieces of DCI monitored per slot does not exceed Y. Y may be, for example, 3 or 4.

[Condition 3]
The number of PDCCH candidates which can be monitored per slot does not exceed Z. Values of Z may be different according to subcarrier spacings, and may be defined as shown in Table 10 below.

TABLE 10

| μ | Maximum number of PDCCH candidates per slot and per serving cell (Z) |
| --- | --- |
| 0 | 44 |
| 1 | 36 |
| 2 | 22 |
| 3 | 20 |

In Table 10, a subcarrier spacing may be defined as $15 \cdot 2^\mu$ kHz.

[Condition 4]
The number of CCEs constituting all search spaces per slot (in this example, all search spaces signifies all CCE sets corresponding to a union region of multiple search space sets) does not exceed W. Values of W may be different according to subcarrier spacings, and may be defined as shown in Table 11 below.

TABLE 11

| μ | Maximum number of CCEs per slot and per serving cell (W) |
|---|---|
| 0 | 56 |
| 1 | 56 |
| 2 | 48 |
| 3 | 32 |

In Table 11, a subcarrier spacing may be defined as $15 \cdot 2^\mu$ kHz.

For convenience of description, a situation in which conditions 1, 2, 3, and 4 are all satisfied at a particular time point is defined as "condition A". Accordingly, non-satisfaction of condition A may imply that at least one condition among conditions 1, 2, 3, and 4 is not satisfied. Condition A may be defined as a search space configuration condition or as a search space configuration-related condition.

The base station may adjust search space parameters (e.g., the parameters in Table 8) such that the above described condition A is satisfied at all time points so as to configure a search space for the terminal.

Alternatively, according to configuration of a search space by the base station, there may occur a case in which the above described condition A is not satisfied at a particular time point. If the above described condition A is not satisfied at a particular time point, only some of search spaces may be selected or dropped so that condition A can be satisfied at the relevant time point.

Figure 6:
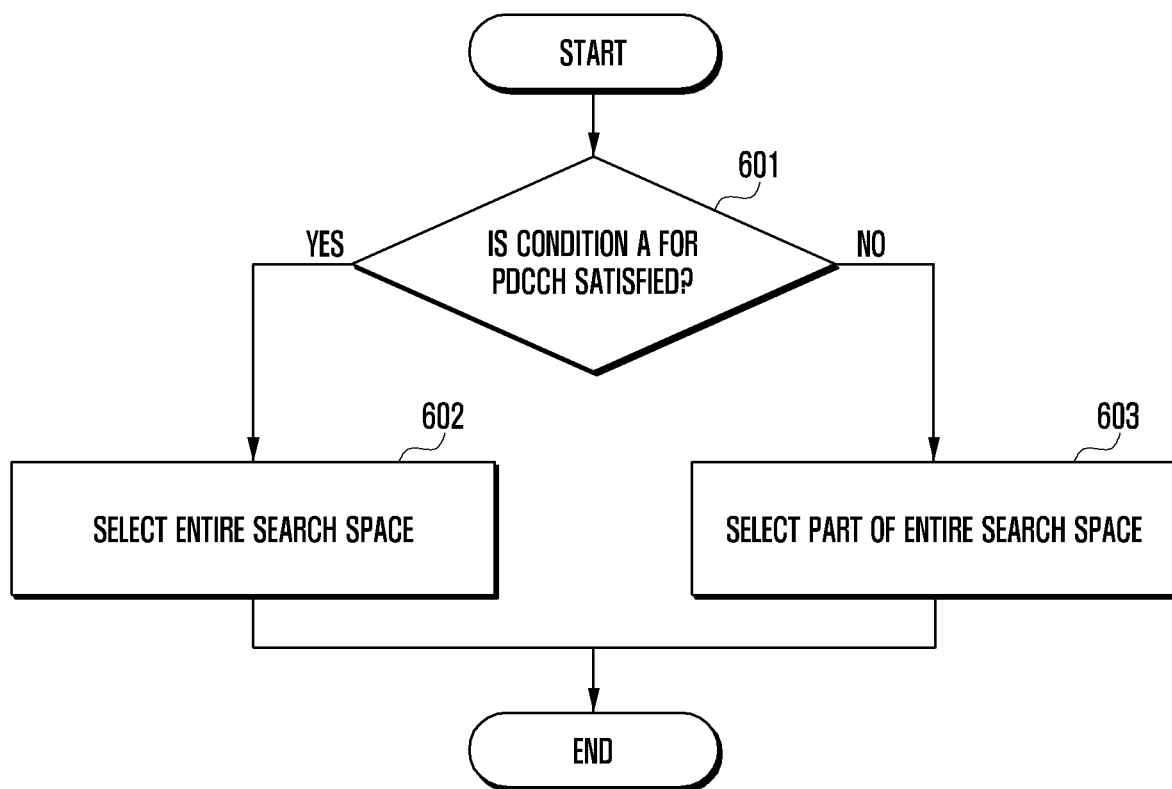
FIG. 6 is a flowchart of a method of a base station and a terminal, according to a first embodiment.

FIG. 6 is a flowchart of a method of a base station and a terminal, according to the embodiment.

Referring to FIG. 6, at step 601, the base station determines whether the above described condition A is satisfied in a particular slot in which a PDCCH is to be transmitted. At step 601, the terminal determines whether the above described condition A is satisfied in a particular slot in which a PDCCH is to be received.

If the above described condition A for a PDCCH is determined to be satisfied at a particular time point, at step 602, both the base station and the terminal may use all the search spaces configured for the terminal at the relevant time point. The base station may transmit a PDCCH in all the search spaces as previously configured, and the terminal may monitor a PDCCH in all the search spaces as previously configured.

If the above described condition A for the PDCCH is not satisfied at the particular time point, at step 603, the base station and the terminal select and use some of the pre-configured search spaces so that the above described condition A can be satisfied at the relevant time point. The base station and the terminal may select or drop only a particular search space set among all the search spaces. Alternatively, the base station and the terminal may select or drop a search space at a particular AL in a particular search space set. Alternatively, the base station and the terminal may select or drop some PDCCH candidates in a particular search space set. A method for selecting or dropping a search space should comply with the rules pre-agreed upon between the base station and the terminal.

In the above description, selection of only some of the search spaces (or identically selecting a particular search space) may be identically construed as dropping the remaining search spaces, except for the selected search space. In a situation in which search space set #1 and search space set #2 are configured, selection of search space set #1 at a particular time point may be identically regarded as dropping search space set #2 at the relevant time point.

Selection of a particular search space may imply that a PDCCH can be transmitted in the relevant search space from the perspective of the base station, and may imply that blind-decoding is performed in the relevant search space from the perspective of the terminal.

Dropping of a particular search space may imply that a PDCCH is not transmitted in the relevant search space from the perspective of the base station, and may imply that blind-decoding is not performed in the relevant search space from the perspective of the terminal.

In the following description, a specific embodiment will propose a method for configuring a search space. If Embodiment 1-1, Embodiment 1-2, Embodiment 1-3, and Embodiment 1-4 described below do not contradict each other, it is possible to combine Embodiments 1-1, 1-2, 1-3, and 1-4 so as to practice the disclosure. A method of Embodiment 1-2 may be added to and combined with a method of Embodiment 1-1, and other embodiments may be combined with each other. The following procedure of each embodiment for selecting a search space may be applied to both a base station and a terminal.

Embodiment 1-1

Figure 7:
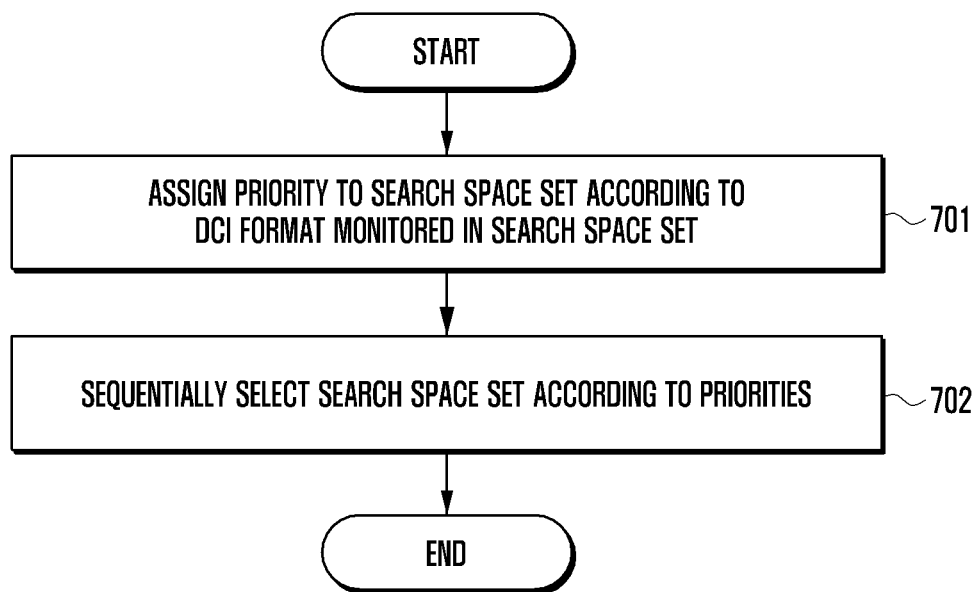
FIG. 7 is a flowchart of a method of a base station and a terminal, according to embodiment 1-1.

FIG. 7 is a flowchart of a method of a base station and a terminal, according to an embodiment.

Referring to FIG. 7, as a method for selecting some of all the search spaces at step 603 of FIG. 6, at step 701, the terminal (or the base station) assigns a priority to a search space set according to a DCI format configured to be monitored in each search space. At step 702, according to the priorities assigned at step 701, the terminal (or the base station) sequentially selects a search space set until condition A is satisfied such that a search space set having a higher priority is first selected.

More specifically, the method for selecting some of search spaces may comply with the following method. If condition A for a PDCCH is not satisfied at a particular time point (slot), among search space sets existing at the relevant time point, the terminal (or the base station) may select a search space set, a search space type of which is configured as a common search space, in preference to a search space set, a search space type of which is configured as a UE-specific search space.

If there exist multiple search space sets of which a search space type is configured as a common search space, different priorities may be assigned according to DCI formats monitored in the search space sets, and a search space set may be selected in descending order of priority until condition A is satisfied. Such a priority according to a DCI format in a common search space may comply with the priority in Table 12 below (a smaller number signifies a higher priority).

TABLE 12

| Priority | DCI format |
|---|---|
| 1 | DCI format 0_0/1_0/2_2/2_3 |
| 2 | DCI format 2_0 |
| 3 | DCI format 2_1 |

If all of the search space sets of which the search space type is configured as a common search space are selected (i.e., if condition A is satisfied even after all the search space sets of which the search space type is configured as a common search space are selected), the terminal (or the base station) may select a search space set, the search space type of which is configured as a UE-specific search space. If there exist multiple search space sets of which the search space type is configured as a UE-specific search space, the terminal (or the base station) may assign different priorities according to DCI formats monitored in the search space sets, and may select a search space set in descending order of priority until condition A is satisfied. Such a priority according to a DCI format in a UE-specific search space may comply with the priority in Table 13 or 14 below (a smaller number signifies a higher priority).

TABLE 13

| Priority | DCI format |
|---|---|
| 1 | DCI format 0_0/1_0 |
| 2 | DCI format 0_1 |
| 3 | DCI format 1_1 |

TABLE 14

| Priority | DCI format |
|---|---|
| 1 | DCI format 0_0/1_0 |
| 2 | DCI format 1_1 |
| 3 | DCI format 0_1 |

As shown in Table 13 and 14, the DCI format 0_0 or 1_0 corresponding to a fallback DCI format may have a higher priority than that of the DCI format 0_1 or 1_1 corresponding to a non-fallback DCI format.

Embodiment 1-1-1

Figure 8:
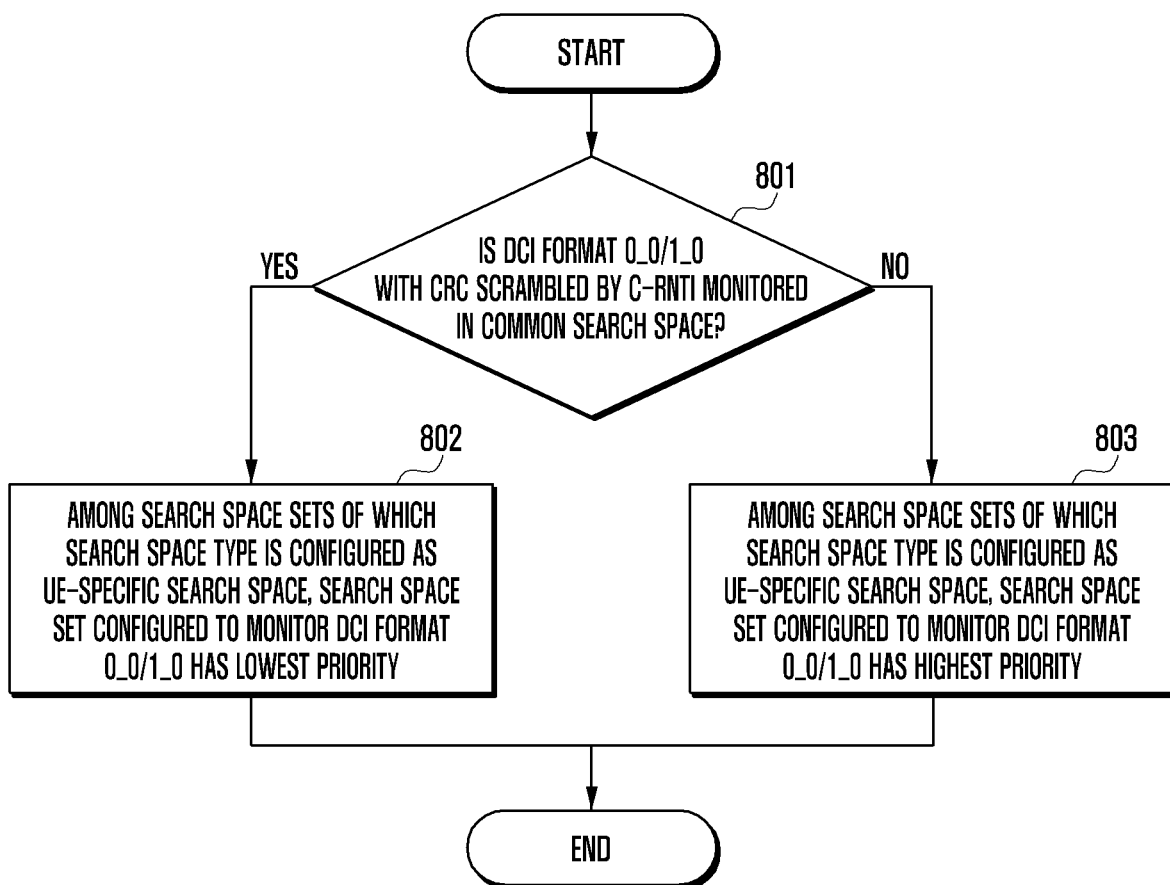
FIG. 8 is a flowchart of a method of a base station and a terminal, according to embodiment 1-1-1.

FIG. 8 is a flowchart of a method of a base station and a terminal, according to an embodiment.

Referring to FIG. 8, in a method for selecting a particular search space set from search space sets of which a search space type is configured as a UE-specific search space, at step 801, the terminal (or the base station) determines whether a DCI format 0_0 or 1_0 with a CRC scrambled by a C-RNTI is configured to be monitored in a common search space.

If it is determined at step 801 that the DCI format 0_0 or 1_0 with the CRC scrambled by the C-RNTI is configured to be monitored in the common search space, at step 802, the terminal (or the base station) determines that a search space set configured to monitor a DCI format 0_0 or 1_0 with a CRC scrambled by a C-RNTI has the lowest priority among search space sets of which a search space type is configured as a UE-specific search space. A priority according to a DCI format in a UE-specific search space may comply with the priority in Table 15 or 16 below.

TABLE 15

| Priority | DCI format |
|---|---|
| 1 | DCI format 0_1 |
| 2 | DCI format 1_1 |
| 3 | DCI format 0_0/1_0 |

TABLE 16

| Priority | DCI format |
|---|---|
| 1 | DCI format 1_1 |
| 2 | DCI format 0_1 |
| 3 | DCI format 0_0/1_0 |

If it is determined at step 801 that the DCI format 0_0 or 1_0 with the CRC scrambled by the C-RNTI is not configured to be monitored in the common search space, at step 803, the terminal (or the base station) determines that a search space set configured to monitor a DCI format 0_0 or 1_0 with a CRC scrambled by a C-RNTI has the highest priority among the search space sets of which a search space type is configured as the UE-specific search space. A priority according to a DCI format in a UE-specific search space may comply with the priority in Table 13 or 14.

If one or more DCI formats are configured to be monitored in one search space set, a priority of the relevant search space set may be determined by a DCI format having the highest priority among the DCI formats.

Embodiment 1-2

Figure 9:
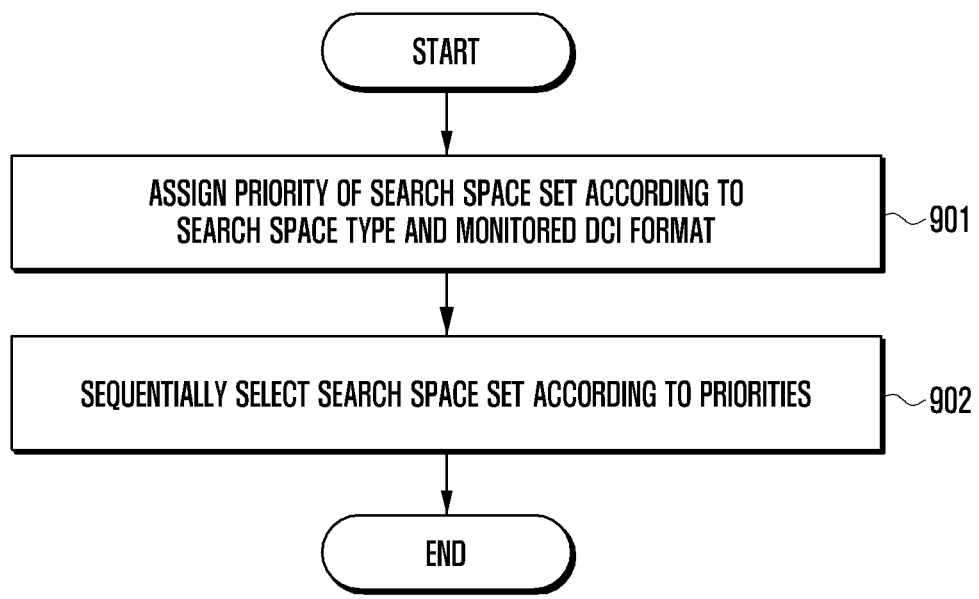
FIG. 9 is a flowchart of a method of a base station and a terminal, according to embodiment 1-2.

FIG. 9 is a flowchart of a method of a base station and a terminal, according to an embodiment.

Referring to FIG. 9, as the method for selecting some of all search spaces at step 603 of FIG. 6, at step 901, among search space sets existing at a relevant time point, the terminal (or the base station) assigns a priority of a search space set according to a combination of a search space type and the type of DCI format monitored in a relevant search space set. At step 902, according to the priorities assigned at step 901, the terminal (or the base station) sequentially selects a search space set until condition A is satisfied such that a search space set having a higher priority is first selected.

More specifically, this configuration may comply with the following method. If a search space for a PDCCH does not satisfy condition A at a particular time point (slot), among search space sets existing at a relevant time point, the terminal (or the base station) may assign different priorities according to a combination of a search space type and the type of DCI format monitored in a relevant search space, and may select a search space set in descending order of priority until condition A is satisfied.

A search space set, which is configured to monitor a DCI format 0_0, 1_0, 2_2, or 2_3 and of which a search space type is a common search space, may have the highest priority. A search space set, which is configured to monitor a DCI format 2_1 and of which a search space type is the common search space, may have the lowest priority.

If there coexists a search space set which is configured to monitor a DCI format 0_0 or 1_0 with a CRC scrambled by a C-RNTI in the common search space and a search space set which is configured to monitor a DCI format 0_0 or 1_0 with a CRC scrambled by a C-RNTI in a UE-specific search space, the latter may have the lowest priority.

A search space set which is configured to monitor a DCI format 0_1 or 1_1 and of which a search space type is the UE-specific search space may have a higher priority than that of a search space set which is configured to monitor a DCI format 2_1 and of which a search space type is the common search space.

A search space set which is configured to monitor a DCI format 0_1 or 1_1 and of which a search space type is the UE-specific search space may have a higher priority than that of a search space set which is configured to monitor a DCI format 0_0/1_0 with a CRC scrambled by a C-RNTI and of which a search space type is the UE-specific search space.

A search space set which is configured to monitor a DCI format 0_1 or 1_1 and of which a search space type is the UE-specific search space may have a higher priority than that of a search space set which is configured to monitor a DCI format 0_0 or 1_1 and of which a search space type is the UE-specific search space. Alternatively, a search space set which is configured to monitor a DCI format 0_1 or 1_1 and of which a search space type is the UE-specific search space may have a lower priority than that of a search space set which is configured to monitor a DCI format 0_0 or 1_1 and of which a search space type is the UE-specific search space.

A priority according to a search space type and a DCI format may comply with the priority in Table 17 below.

TABLE 17

| Priority | Search space type | DCI format |
| --- | --- | --- |
| 1 | common search space | DCI format 0_0/1_0/2_2/2_3 |
| 2 | common search space | DCI format 2_0 |
| 3 | UE-specific search space | DCI format 0_0/1_0 |
| 4 | UE-specific search space | DCI format 0_1/1_1 |
| 5 | common search space | DCI format 2_1 |

As shown in Table 17, among a DCI format 0_0 or 1_0 and a DCI format 0_1 or 1_1 which are monitored in the UE-specific search space, the former may have a higher priority than that of the latter.

A priority according to a search space type and a DCI format may comply with the priority in Table 18 below.

TABLE 18

| Priority | Search space type | DCI format |
| --- | --- | --- |
| 1 | common search space | DCI format 0_0/1_0/2_2/2_3 |
| 2 | common search space | DCI format 2_0 |
| 3 | UE-specific search space | DCI format 0_1/1_1 |
| 4 | UE-specific search space | DCI format 0_0/1_0 |
| 5 | common search space | DCI format 2_1 |

As shown in Table 18, among a DCI format 0_1 or 1_1 and a DCI format 0_0 or 1_0 which are monitored in the UE-specific search space, the former may have a higher priority than that of the latter.

A priority according to a search space type and a DCI format may comply with the priority in Table 19 below.

TABLE 19

| Priority | Search space type | DCI format |
| --- | --- | --- |
| 1 | common search space | DCI format 0_0/1_0/2_2/2_3 |
| 2 | common search space | DCI format 2_0 |
| 3 | UE-specific search space | DCI format 0_1/1_1 |
| 4 | common search space | DCI format 2_1 |
| 5 | UE-specific search space | DCI format 0_0/1_0 |

If there coexists a search space set which is configured to monitor a DCI format 0_0 or 1_0 with a CRC scrambled by a C-RNTI in the common search space and a search space set which is configured to monitor a DCI format 0_0 or 1_0 with a CRC scrambled by a C-RNTI in the UE-specific search space, this configuration may comply with the priority in Table 19.

If one search space set is configured to monitor one or more DCI formats, a priority of the relevant search space set may be determined by a DCI format having the highest priority among the configured DCI formats.

If one or more search space sets have the same priority, a priority may become higher as a search space set index becomes lower (or higher).

Embodiment 1-3

If a search space for a PDCCH does not satisfy condition A at a particular time point (slot), a base station and a terminal may assign different priorities to search space sets existing at the relevant time point by using various methods (e.g., a search space type, a combination of a search space type and a DCI format, and an index of a search space set), and may select a search space set in descending order of priority until condition A is satisfied.

In the process of selecting a search space set in descending order of priority, if condition A is satisfied until an n-th search space set is selected and condition A is not satisfied in the case of selection of an (n+1)-th search space set, the terminal (or the base station) may select a search space set until the n-th search space set is finally selected. A selected search space set always includes all PDCCH candidates existing in the relevant search space set, and does not include only some PDCCH candidates existing in the relevant search space set.

Embodiment 1-4

If a search space for a PDCCH does not satisfy condition A at a particular time point (slot), a base station and a terminal may assign different priorities to search space sets existing at the relevant time point by using various methods (e.g., a search space type, a combination of a search space type and a DCI format, and an index of a search space set), and may select a search space set in descending order of priority until condition A is satisfied.

If condition A is satisfied until an n-th search space set is selected and condition A is not satisfied in the case of selection of an (n+1)-th search space set, the terminal (or the base station) may select only some PDCCH candidates in the (n+1)-th search space set so that condition A can be satisfied. A finally-selected search space set may include some of PDCCH candidates existing in the relevant search space set.

A method for selecting some of PDCCH candidates in a particular search space set may comply with the following embodiments.

Embodiment 1-4-1

As a method for selecting some of PDCCH candidates in a particular search space set, a terminal (or a base station) may sequentially select search spaces configured according to aggregation levels in a search space set. Different priorities may be assigned according to aggregation levels, and a search space may be selected in descending order of priority.

[Method 1]

The terminal (or the base station) may preferentially select PDCCH candidates corresponding to lower aggregation levels. PDCCH candidates existing at lower aggregation levels may have higher priorities.

[Method 2]

The terminal (or the base station) may preferentially select PDCCH candidates corresponding to higher aggregation levels. PDCCH candidates existing at higher aggregation levels may have higher priorities.

[Method 3]

The terminal (or the base station) may determine the order of aggregation levels to be selected on the basis of a time index, a slot index, a subframe index, or a frame index, (in the following description, it is considered to be a slot index but may correspond to various time indices without being limited thereto) for monitoring of a relevant search space set. For convenience of description, l is defined as an aggregation level index. Aggregation levels configured in a search space set may be mapped one-to-one to aggregation level indices. This relationship is defined as a function AL(•). If aggregation levels are set to 1, 2, 4, and 8, an aggregation level index and an aggregation level may have the relationship in Table 20 below.

TABLE 20

| L | Aggregation level |
|---|---|
| 0 | 1 |
| 1 | 2 |
| 2 | 4 |
| 3 | 8 |

As shown in Table 20, an aggregation level index and an aggregation level may have the relationship, such as AL(0)= aggregation level 1, AL(1)=aggregation level 2, AL(2)=aggregation level 4, and AL(3)=aggregation level 8. An index $l_{start}$ of an aggregation level (first aggregation level) corresponding to the highest priority may be determined by Equation (2) below.

$$l_{start} = \text{modulo}(\text{slot index}, \text{number of all configured ALs}) \quad (2)$$

In Equation (2), modulo (A, B) is a function which outputs the remainder after dividing A by B, and the number of all configured aggregation levels may correspond to the total number of aggregation levels, for which the number of PDCCH candidates is set to a value which is not zero.

An aggregation level may be sequentially selected such that an aggregation level (first aggregation level) corresponding to $AL(l_{start})$ determined as described above is first selected.

The terminal (or the base station) may select an aggregation level in ascending order of aggregation level such that the first aggregation level is first selected. For example, for AL=1, 2, 4, and 8, if the first aggregation level is 2, an aggregation level may be selected in the order of {2, 4, 8, 1}.

The terminal (or the base station) may select an aggregation level in descending order of aggregation level such that the first aggregation level is first selected. For example, for AL=1, 2, 4, and 8, if the first aggregation level is 2, an aggregation level may be selected in the order of {2, 1, 8, 4}.

The terminal (or the base station) may select an aggregation level in order of closeness of aggregation levels to the first aggregation such that the first aggregation level is first selected. For example, for AL=1, 2, 4, and 8, if the first aggregation level is 2, an aggregation level may be selected in the order of {2, 1, 4, 8} or {2, 4, 1, 8}.

An aggregation level selected in a particular slot is randomized using Method 3 of Embodiment 1-4-1, and thus an aggregation level, at which a PDCCH can be transmitted, can be flexibly selected.

[Method 4]

The terminal (or the base station) may determine the order of aggregation levels to be selected on the basis of a parameter for determination of a search space, for example, a value of $Y_{p,n_{s,f}}^{\mu}$ in Equation (1). An index $l_{start}$ of an aggregation level (first aggregation level) corresponding to the highest priority may be determined by Equation (3) below:

$$l_{start} = \text{modulo}(Y_{p,n_{s,f}}^{\mu}, \text{number of all configured ALs}) \quad (3)$$

The terminal (or the base station) may sequentially select an aggregation level such that an aggregation level (first aggregation level) corresponding to $AL(l_{start})$ determined as described above is first selected.

The terminal (or the base station) may select an aggregation level in ascending order of aggregation level such that the first aggregation level is first selected. For example, for AL=1, 2, 4, and 8, if the first aggregation level is 2, an aggregation level may be selected in the order of {2, 4, 8, 1}.

The terminal (or the base station) may select an aggregation level in descending order of aggregation level such that the first aggregation level is first selected. For example, for AL=1, 2, 4, and 8, if the first aggregation level is 2, an aggregation level may be selected in the order of {2, 1, 8, 4}.

The terminal (or the base station) may select an aggregation level in order of closeness of aggregation levels to the first aggregation such that the first aggregation level is first selected. For example, for AL=1, 2, 4, and 8, if the first aggregation level is 2, an aggregation level may be selected in the order of {2, 1, 4, 8} or {2, 4, 1, 8}.

The terminal (or the base station) randomizes an aggregation level selected in a particular slot by using Method 3 of Embodiment 1-4-1, and thus an aggregation level, at which a PDCCH can be transmitted, can be flexibly selected.

Embodiment 1-4-2

As a method for selecting some of PDCCH candidates in a particular search space set a terminal (or a base station) may sequentially select search spaces configured according to aggregation levels in a search space set. Different priorities may be assigned according to aggregation levels, and a search space may be selected in descending order of priority.

If condition A is satisfied until a search space at an m-th aggregation level is selected and condition A is not satisfied in the case of selection of a search space at an (m+1)-th aggregation level, the terminal (or the base station) may select a search space until the search space at the m-th aggregation level is finally selected. The terminal (or the base station) allows a selected search space to always include all PDCCH candidates existing in the relevant search space.

Embodiment 1-4-3

As a method for selecting some of PDCCH candidates in a particular search space set a terminal (or a base station) may sequentially select search spaces configured according to aggregation levels in a search space set. Different priorities may be assigned according to aggregation levels, and a search space may be selected in descending order of priority.

If condition A is satisfied until a search space at an m-th aggregation level is selected and condition A is not satisfied in the case of selection of a search space at an (m+1)-th aggregation level, the terminal (or the base station) may select only some PDCCH candidates in the search space at the (m+1)-th aggregation level so that condition A can be satisfied. A finally-selected search space may include some of PDCCH candidates existing in the relevant search space.

As a method for selecting some of PDCCH candidates in a particular search space, the terminal (or the base station) may determine the order of PDCCH candidates to be selected on the basis of a PDCCH candidate index. A PDCCH candidate index is an index assigned to a PDCCH candidate constituting a search space at a particular aggregation level, and may correspond to a value of $m_{s,n_{CI}}$ in Equation (1). A PDCCH candidate index $m_{s,n_{CI}}$ at an aggregation level L in an s-th search space set may be defined as 0, 1, . . . , $M_{p,s}^{(L)}-1$, and $M_{p,s}^{(L)}$ signifies the number of PDCCH candidates. This configuration may comply with the following methods.

[Method 5]

The terminal (or the base station) may preferentially select PDCCH candidates having a lower PDCCH candidate index. The PDCCH candidates having the lower PDCCH candidate index may have a higher priority.

[Method 6]

The terminal (or the base station) may preferentially select PDCCH candidates having a higher PDCCH candidate index. The PDCCH candidates having the higher PDCCH candidate index may have a higher priority.

If PDCCH candidates are selected using Method 4 or Method 5, the selected PDCCH candidates always have a relatively low or high index, and thus search spaces of all terminals are configured to have only PDCCH candidates always having a relatively low or high index, which may increase a blocking probability. Therefore, the following methods may be additionally considered so that PDCCH candidates selected for respective terminals can be more randomly distributed.

[Method 7]

The terminal (or the base station) may determine an index of PDCCH candidates to be selected on the basis of a terminal ID (e.g., a C-RNTI). As a method for selecting P PDCCH candidates from a total of M PDCCH candidates, a total of P (e.g., modulo($m_{start}$+(p−1), p=1, . . . P, PDCCH candidates may be sequentially selected from PDCCH candidates having an index $m_{start}$. Modulo calculation is used such that a PDCCH index does not exceed a maximum PDCCH index M−1. $m_{start}$ may be defined by Equation (4) below:

$$m_{start} = \text{modulo (terminal ID}, M) \quad (4)$$

The PDCCH candidates selected for the respective terminals may be more randomly distributed using Method 7.

The terminal ID may correspond to a C-RNTI.

Alternatively, in Equation (4), in addition to a C-RNTI, the terminal ID may correspond to one of various RNTIs scrambled to a CRC of a DCI format to be monitored (e.g., TC-RNTI, CS-RNTI, RA-RNTI, P-RNTI, SI-RNTI, INT-RNTI, TPC-PUSCH-RNTI, TPC-PUCCH-RNTI, and TPC-SRS-RNTI).

[Method 8]

The terminal (or the base station) may determine a parameter for determination of a search space (e.g., an index of a PDCCH candidate to be selected on the basis of a value of $Y_{p,n_{s,f}^{\mu}}$ in Equation (1)). A method for selecting P PDCCH candidates from a total of M PDCCH candidates, a total of P (e.g., $m_{start}$+1, $m_{start}$+2, . . . , modulo ($m_{start}$+(P−1), M), PDCCH candidates may be sequentially selected from PDCCH candidates having an index $M_{start}$. $m_{start}$ may be determined by Equation (5) below:

$$m_{start} = \text{modulo}(Y_{p,n_{s,f}^{\mu}}, M) \quad (5)$$

As defined in Equation (5), $Y_{p,n_{s,f}^{\mu}}$ may have a value of zero for a common search space, and may have a value determined by an RNTI and a slot index for a UE-specific search space. PDCCH candidates selected for respective terminal may be more randomly distributed using Method 8.

Embodiment 1-4-3 is described as a method for selecting some of PDCCH candidates in a search space at a particular aggregation level, but without being limited thereto, may be extended and applied to a method for selecting some of PDCCH candidates in a particular search space, multiple search spaces, a particular search space set, or multiple search space set.

Various methods of Embodiment 1-4-3 may be applied only to a search space set, a search space type of which is configured as a UE-specific search space. Alternatively, the various methods of Embodiment 1-4-3 may be applied to a search space set, a search space type of which is configured as a common search space or the UE-specific search space.

Embodiment 1-4-4

As a method for selecting some of PDCCH candidates in a particular search space set, a terminal (or a base station) may select PDCCH candidates so that aggregation levels configured in the relevant search space set can be evenly selected if possible. The terminal (or the base station) may consider an aggregation level-first/PDCCH candidate index-second method, as a method for determining a PDCCH candidate on the basis of a combination of an aggregation level and a PDCCH candidate index. The aggregation level-first/PDCCH candidate index-second method may correspond to a method for preferentially repeating, in a search space at each aggregation level, a process for selecting an m-th PDCCH candidate at an l-the aggregation level, and repeating, for (m+1)-th PDCCH candidates, the same process if the m-th PDCCH candidates are all selected in search spaces at all aggregation levels.

Figure 10:
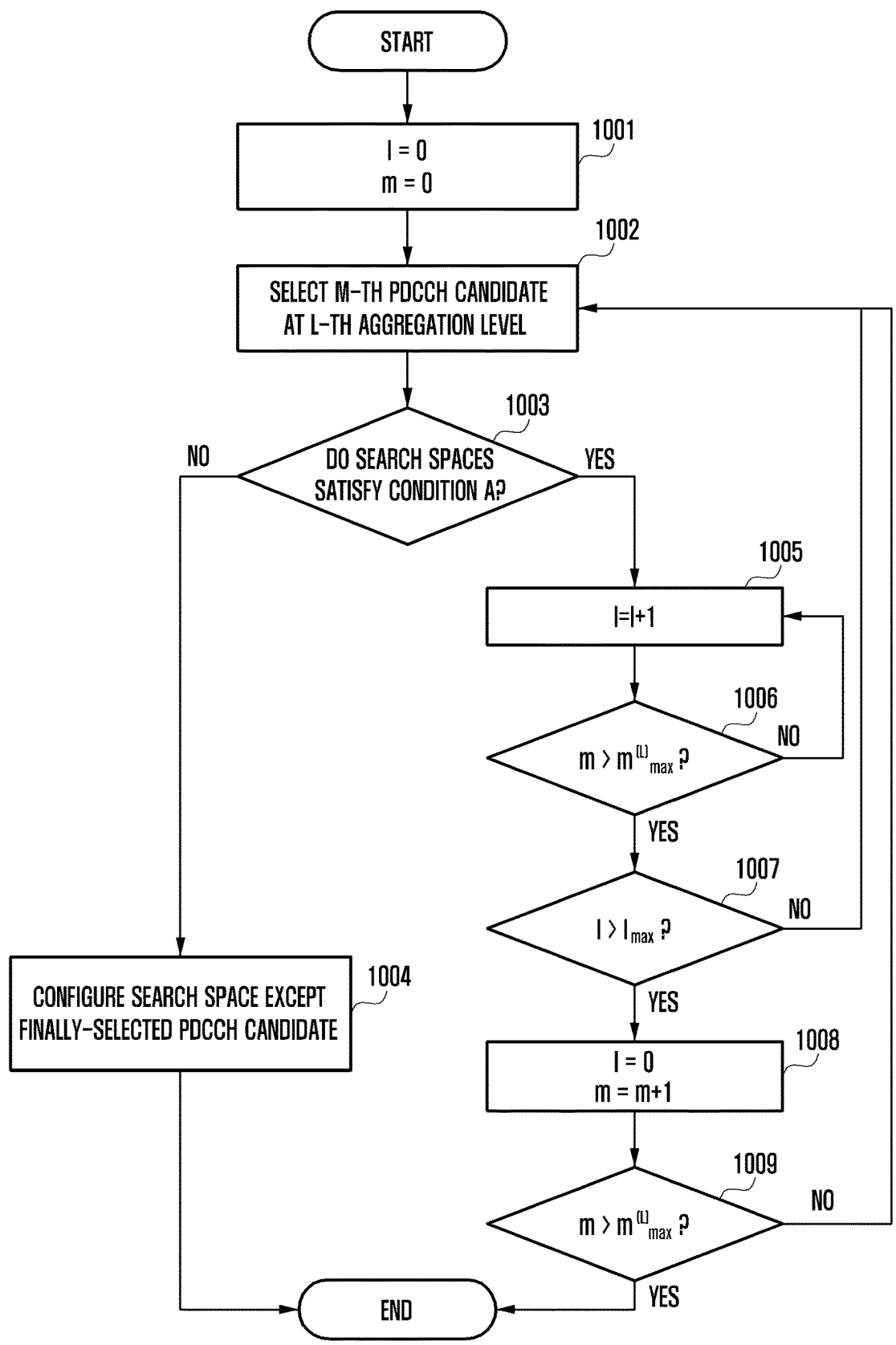
FIG. 10 is a flowchart of a method of a base station and a terminal, according to embodiment 1-4-4.

FIG. 10 is a flowchart of a method of a base station and a terminal, according to an embodiment.

In FIG. 10, l(=0, 1, . . . , $l_{max}$) signifies aggregation level index, m(=0, 1, . . . , $m_{max}^{(L)}$) signifies PDCCH candidate index, $l_{max}$ may be defined as the total number of aggregation levels configured in a search space set, $m_{max}^{(L)}$ may be defined as the total number of PDCCH candidates in an L-th search space, and L may be defined as value of an l-th aggregation level.

At step 1001, the terminal (or the base station) initializes an aggregation level index l and a PDCCH candidate index m. In an example of FIG. 10, l and m are both initialized to 0.

Thereafter, the terminal (or the base station) determines initial values (i.e., indices corresponding to the highest priorities) of an aggregation level index 1 and a PDCCH candidate index m, and the methods described in Embodiment 1-4-1 and Embodiment 1-4-3 may be applied as methods for the same.

At step 1002, the terminal (or the base station) selects an m-th PDCCH candidate in a search space at an l-th aggregation level.

At step 1003, if the m-th PDCCH candidate in the search space at the l-th aggregation level is selected, the terminal (or the base station) determines whether the search spaces having been selected until now satisfy condition A. If condition A is not satisfied, at step 1004, the terminal (or the base station) configures a search space by using the search spaces having been selected until now except the PDCCH candidate selected at step 1003, and may terminate the operation.

If condition A is determined at step 1003 to be satisfied, then, the terminal (or the base station) determines a PDCCH candidate to be selected. To this end, at step 1005, the terminal (or the base station) increases an aggregation level index. The terminal (or the base station) may update l to l=l+1 so as to select a PDCCH candidate at an (l+1)-th aggregation level.

At step 1006, the terminal (or the base station) determines whether a value of the current m is greater than a maximum value $m_{max}^{(L)}$ at an aggregation level L corresponding to the updated aggregation level index 1. If the value of the current m is greater than $m_{max}^{(L)}$, at step 1005, the current aggregation level may be updated to the next aggregation level (i.e., a value of l is updated once more).

If the value of the current m is less than or equal to $m_{max}^{(L)}$ at step 1007, the terminal (or the base station) determines whether the updated 1 is greater than a maximum value $l_{max}$ of an aggregation level index. If the value of the updated 1 is less than or equal to $l_{max}$, the terminal (or the base station) return to step 1002, and may again select the m-th PDCCH candidate at the updated l-th aggregation level.

If it is determined at step 1007 that the value of the updated 1 is greater than $l_{max}$, the method proceeds to step 1008, re-initializing the value of 1. Then, at step 1008, the terminal (or the base station) increases the PDCCH candidate index. The terminal (or the base station) may update m to m+1 so as to allow selection of an (m+1)-th PDCCH candidate. If it is determined at step 1007 that the value of the updated 1 is less than or equal to $l_{max}$, the method returns to step 1002.

After step 1008, at step 1009, the terminal (or the base station) determines whether the updated m is greater than a maximum value $m_{max}^{(L)}$ at an aggregation level L corresponding to an aggregation level index 1. If the value of m is less than or equal to $m_{max}^{(L)}$, the method returns to step 1002, and an m-th PDCCH candidate is selected again, updated at the initialized l-th aggregation level. If the value of m is greater than $m_{max}^{(L)}$, the terminal (or the base station) determines that a PDCCH candidate to be selected no longer exists, and may terminate selection of a search space.

Embodiment 1-4-5

As a method for selecting some of PDCCH candidates in a particular search space set, a terminal (or a base station) may comply with the following methods.

[Condition 1]

Among PDCCH candidates in a search space set, it is possible to select a PDCCH candidate at a particular aggregation level including a largest number of CCEs which overlap a PDCCH candidate at another aggregation level. More specifically, if a PDCCH candidate at an aggregation level X and a PDCCH candidate at an aggregation level Y include one or more identical CCEs, these CCEs may be defined as overlapping CCEs, and the number of times of overlapping CCEs may be defined as $N_{overlapped}$. A particular CCE may overlap up to a maximum of M-times (i.e., a maximum value of $N_{overlapped}$ is M), and M may correspond a total number of aggregation levels configured in a relevant search space set. When any search space set includes search spaces at AL={1, 2, 4, 8}, if a largest number of CCEs overlap each other among all CCEs constituting the relevant search space set, a maximum value of $N_{overlapped}$ may be 4.

[Condition 2]

If multiple PDCCH candidates satisfy condition 1, the terminal (or the base station) may select a PDCCH candidate at the highest aggregation level.

[Condition 3]

If multiple PDCCH candidates satisfy condition 1 and condition 2, a PDCCH candidate having the largest sum of the numbers of overlapping CCEs may be selected.

[Condition 4]

If multiple PDCCH candidates satisfy condition 1, condition 2, and condition 3, the terminal (or the base station) may select a PDCCH candidate having the lowest PDCCH candidate index.

Second Embodiment

A second embodiment describes a method for reinterpreting the contents of a resource allocation field of a DCI format.

The 5G system may include fallback DCI (DCI format 1_0) for downlink data scheduling, non-fallback DCI (DCI format 1_1) for downlink data scheduling, fallback DCI (DCI format 0_0) for uplink data scheduling, and non-fallback DCI (DCI format 0_1) for uplink data scheduling. In the 5G system, zeros are padded to a DCI format having a relatively small size so that a DCI format 0_0 or 1_0 has always the same DCI size. Therefore, the DCI format having a relatively small size can have the same size as that of a DCI format having a relatively large size. In the 5G system, a CRC of the DCI format 0_0 or 1_0 may be scrambled by a C-RNTI, and may be used to schedule a unicast data channel of a terminal. The DCI format 0_0 or 1_0 may be monitored in a common search space or a UE-specific search space.

The 5G system supports configuration and operation of a bandwidth part, and thus the size of each DCI format may be determined under the influence of bandwidth part-specific configuration, the bandwidth of a bandwidth part, and the like. A size of a field of frequency-axis resource allocation information in a DCI format may be determined by the bandwidth of a bandwidth part and the size of a resource block group (RBG) configured within the relevant bandwidth part.

Each field of a DCI format 0_0 or 1_0 is not affected by an RRC configuration for the terminal. However, a frequency resource allocation information field in the DCI format 0_0 or 1_0 may be affected by the size of a particular bandwidth for monitoring of the relevant DCI format.

A size of a frequency-axis resource allocation field in a DCI format 0_0 may be defined by considering the number of RBs ($N_{RB}^{UL,BWP}$) corresponding to the bandwidth of an uplink bandwidth part, and may comply with the following configuration:

Frequency domain resource allocation: $[\log_2(N_{RB}^{UL,BWP}(N_{RB}^{UL,BWP}+1)/2)]$ bits A size of a frequency-axis resource allocation field in a DCI format 0_1 may be defined by considering the number of RBs ($N_{RB}^{DL,BWP}$) corresponding to the bandwidth of a downlink bandwidth part, and may comply with the following configuration:

Frequency domain resource allocation: $[\log_2(N_{RB}^{DL,BWP}P(N_{RB}^{DL,BWP}+1)/2)]$ bits.

A method for determining a size of a frequency-axis resource allocation field in a DCI format 0_0 or a DCI format 1_0, may comply with the following method. The terminal may determine a size of a frequency-axis resource allocation field on the basis of the bandwidth size of an initial bandwidth part. That is, $N_{RB}^{UL,BWP}$ and $N_{RB}^{DL,BWP}$ may correspond to the bandwidth size of the initial bandwidth part. The initial bandwidth part may correspond to a bandwidth part configured for the terminal via a MIB at an initial access stage.

The above described method may be applied to only a case in which the DCI format 0_0 or 1_0 is monitored in a common search space. Alternatively, the above described method may be applied to a case in which the DCI format 0_0 or 1_0 is monitored in a common search space or a UE-specific search space.

When a size of the DCI format 0_0 or 1_0 is determined on the basis of the above described method, if a bandwidth size of an actually-activated bandwidth part of the terminal is different from a bandwidth size of an initial (or basic) bandwidth part of the terminal, frequency-axis resource allocation may be very inefficiently indicated to the terminal. When a size of the DCI format 1_0 is determined using Method 1 and information used to schedule a PDSCH in a currently-activated bandwidth part is indicated to the relevant terminal in the DCI format 1_0, if a bandwidth size of an initial bandwidth part corresponds to 10 MHz and a size of a currently-activated bandwidth of the terminal corresponds to 100 MHz, frequency-axis resource allocation information may be indicated only in a bandwidth corresponding to 10 MHz, and thus frequency-axis resource allocation may be very inefficiently indicated to the terminal.

Described herein are embodiments relating to a method for reinterpreting frequency-axis resource allocation information when data is scheduled using a DCI format 0_0 or 1_0 in order to solve the above mentioned problem.

If Embodiment 2-1, Embodiment 2-2, Embodiment 2-3, Embodiment 2-4, Embodiment 2-5, and Embodiment 2-6 described below do not contradict each other, it is possible to combine Embodiments 2-1, 2-2, 2-3, 2-4, 2-5, and 2-6 so as to practice the disclosure. For example, a method of Embodiment 2-2 may be added to and combined with a method of Embodiment 2-1, and other embodiments may be combined with each other.

Embodiment 2-1

A terminal may monitor a DCI format 0_0 or 1_0 in a currently-activated bandwidth part in a common search space or a UE-specific search space. In this example, a size of a frequency-axis resource allocation field in the DCI format 0_0 or 1_0 may be determined on the basis of the bandwidth of an initial bandwidth part. The terminal may acquire, from the DCI format 0_0 or 1_0, data scheduling information in the currently-activated bandwidth part.

If the bandwidth of the initial bandwidth part is X RB and the bandwidth of the currently-activated bandwidth part is Y RB, the terminal may determine a size of a frequency-axis resource allocation information field in consideration of a scaling factor Z. The scaling factor Z may be determined by the following method:

Z=ceiling (Y/X); or
Z=flooring (Y/X).

In consideration the scaling factor Z, a size of frequency-axis allocation information in the DCI format 0_0 or 1_0 may be determined as follows:

$[\log_2(Z \cdot N_{RB}^{BWP}(Z \cdot N_{RB}^{BWP}+1)/2)]$ bits.

$N_{RB}^{BWP}$ may correspond to X representing a bandwidth size of an initial uplink or downlink bandwidth part.

Embodiment 2-1 may be applied regardless of an RNTI scrambled to a CRC of the DCI format 0_0 or 1_0. Alternatively, Embodiment 2-1 may be applied to a case in which a CRC of the DCI format 0_0 or 1_0 is scrambled by an RNTI.

Embodiment 2-2

A terminal may monitor a DCI format 0_0 or 1_0 with a CRC scrambled by a C-RNTI in a currently-activated bandwidth part in a common search space or a UE-specific search space. A size of a frequency-axis resource allocation field in the DCI format 0_0 or 1_0 may be determined on the basis of the bandwidth of an initial bandwidth part. The terminal may acquire, from DCI format 0_0 or 1_0, data scheduling information in the currently-activated bandwidth part.

A size of frequency-axis allocation information in the DCI format 0_0 or 1_0 may be determined as follows:

$[\log_2(N_{RB}^{BWP}(N_{RB}^{BWP}+1)/2)]$ bits.

$N_{RB}^{BWP}$ may correspond to X representing a bandwidth size of an initial downlink or uplink bandwidth part.

If the bandwidth of an initial bandwidth part is X RB and the bandwidth of the currently-activated bandwidth part is Y RB, the terminal may reinterpret information by using a frequency-axis resource allocation information field in the currently-activated bandwidth part in consideration of a scaling factor Z. The scaling factor Z may be determined by the following method:

Z=ceiling (Y/X); or
Z=flooring (Y/X).

If frequency-axis allocation information is indicated as $[\log_2(N_{RB}^{BWP}(N_{RB}^{BWP}+1)/2)]$ bits, the terminal may reinterpret the frequency-axis allocation information in consideration of the size of an RBG using a scaling factor Z. The frequency-axis allocation information may correspond to frequency allocation type 1 as shown in Table 21 below:

TABLE 21

In downlink resource allocation of type 1, the resource block assignment information indicates to a scheduled UE a set of contiguously allocated localized or distributed virtual resource blocks within the active carrier bandwidth part of size $N_{BWP}^{size}$ PRBs except for the case when DCI format 1_0 is decoded in the common search space in CORESET 0 in which case the initial bandwidth part of size $N_{BWP}^{size}$ shall be used.
A downlink type 1 resource allocation field consists of a resource indication value (RIV) corresponding to a starting virtual resource block ($RB_{start}$) and a length in terms of contiguously allocated resource blocks $L_{RBs}$. The resource indication value is defined by;
if $(L_{RBs} - 1) \leq \lfloor N_{BWP}^{size}/2 \rfloor$ then
 $RIV = N_{BWP}^{size}(L_{RBs} - 1) + RB_{start}$
else
 $RIV = N_{BWP}^{size}(N_{BWP}^{size} - L_{RBs} + 1) + (N_{BWP}^{size} - 1 - RB_{start})$
Where $L_{RBs} \geq 1$ and shall not exceed $N_{BWP}^{size} - RB_{start}$.

Frequency allocation type 1 may indicate a start point ($RB_{start}$) of a scheduled data channel and the number of consecutive RBs ($L_{RB}$) thereof. The terminal may reinterpret the start point and the number of consecutive RBs in consideration of the defined scaling factor. The terminal may regard $RB_{start}$ as $RB_{start} \cdot Z$ and may regard $L_{RB}$ as $L_{RB} \cdot Z$ so as to reinterpret frequency allocation information.

Embodiment 2-2 may be applied regardless of an RNTI scrambled to a CRC of the DCI format 0_0 or 1_0. Alternatively, Embodiment 2-2 may be applied to a case in which a CRC of the DCI format 0_0 or 1_0 is scrambled by a C-RNTI.

A base station may transmit frequency-axis allocation information by using DCI in consideration of the size of a currently-activated bandwidth part, and the terminal may reinterpret the acquired DCI in consideration of the size of a currently-activated bandwidth part.

A method for reinterpreting a field in DCI which complies with Embodiment 2-2 is not limited to a DCI format 0_0 or 1_0, but can be extended and applied to a DCI format 0_1 or 1_1. A currently-activated bandwidth part is assumed to be a first bandwidth part and a bandwidth indicated in DCI (i.e., a bandwidth part in which a PDSCH or a PUSCH is actually scheduled) is assumed to be a second bandwidth part. If a bandwidth of a first bandwidth part is X RB and a bandwidth of a second bandwidth part is Y RB, in order to reinterpret frequency-axis resource allocation information in a DCI format 0_1 or 1_1, a scaling factor Z may be defined as follows:

Z=ceiling (Y/X) or Z=flooring (Y/X).

A size of a frequency-axis resource allocation field in the DCI format 0_1 or 1_1 may be determined as the bandwidth of a first bandwidth part. The terminal may reinterpret the contents of a frequency-axis resource allocation field in DCI, received in the first bandwidth part, in consideration of the scaling factor Z.

[Frequency Allocation Type 0 (i.e., Bitmap Scheme)]

A frequency-axis resource allocation field in DCI, acquired in a first bandwidth part, may indicate an allocated resource in a bitmap for an RB in which data is scheduled. A bitmap may be indicated in the unit of RBG. If the size of an RGB in the first bandwidth part is set to W, when information of the frequency-axis resource allocation field in the relevant DCI is interpreted, the terminal may regard the size of RBG as W·Z so as to reinterpret the information of the frequency-axis resource allocation field in the relevant DCI as frequency-axis allocation information for a second bandwidth part.

[Frequency Allocation Type 1]

A frequency-axis resource allocation field in DCI, acquired in a first bandwidth part, may indicate a start point ($RB_{start}$) of a channel and the number of consecutive RBs ($L_{RB}$) thereof. The terminal may reinterpret the start point and the number of consecutive RBs in consideration of the defined scaling factor Z. The terminal may regard $RB_{start}$ as $RB_{start}·Z$ and may regard $L_{RB}$ as $L_{RB}·Z$, and may reinterpret $RB_{start}·Z$ and $L_{RB}·Z$ as frequency-axis allocation information for a second bandwidth part.

Embodiment 2-3

A terminal may monitor a DCI format 0_0 or 1_0 in a currently-activated bandwidth part in a common search space or a UE-specific search space. A size of a time-axis resource allocation field in the DCI format 0_0 or 1_0 may be determined on the basis of a predefined time-axis resource allocation table (which is named "first time-axis resource allocation table"). The time-axis resource allocation table may be configured by a combination of pieces of information, including a mapping type of a data channel, a start symbol of a data channel, the length of a data channel, a start slot of a data channel, and the like. The terminal may acquire, from the DCI format 0_0 or 1_0, data scheduling information in the currently-activated bandwidth part.

The following methods may be considered as a method for reinterpreting information by using a time-axis resource allocation field in a DCI format 0_0 or 1_0 as a time-axis resource allocation information field in a currently-activated bandwidth part.

[Method 9]

Time-axis resource allocation information may be acquired on the basis of a predefined first time-axis resource allocation table. A first time-axis resource allocation table may have four entries, and one of the values in the table may be indicated using two bits. A base station may indicate, to a terminal, only one of the values in the first time-axis resource allocation table, and when bits of a relevant DCI field are interpreted, the terminal may interpret the bits of the relevant DCI field on the basis of the first time-axis resource allocation table, and may apply a result of the interpretation.

[Method 10]

Time-axis resource allocation information may be acquired on the basis of a time-axis resource allocation table configured for a bandwidth part currently being activated. Consideration is given to a case in which a first time-axis resource allocation table may have four entries and thus the size of a time-axis resource allocation field in DCI may be indicated using two bits. The time-axis resource allocation table in the bandwidth part currently being activated may include 16 entries. In this configuration, one of four entries among the 16 entries may be indicated to a terminal by using two bits of DCI. The terminal may map the contents of the DCI, indicated by the two bits, to the time-axis resource allocation table configured for the bandwidth part currently being activated so as to reinterpret the contents of the DCI.

Embodiment 2-4

Figure 11:
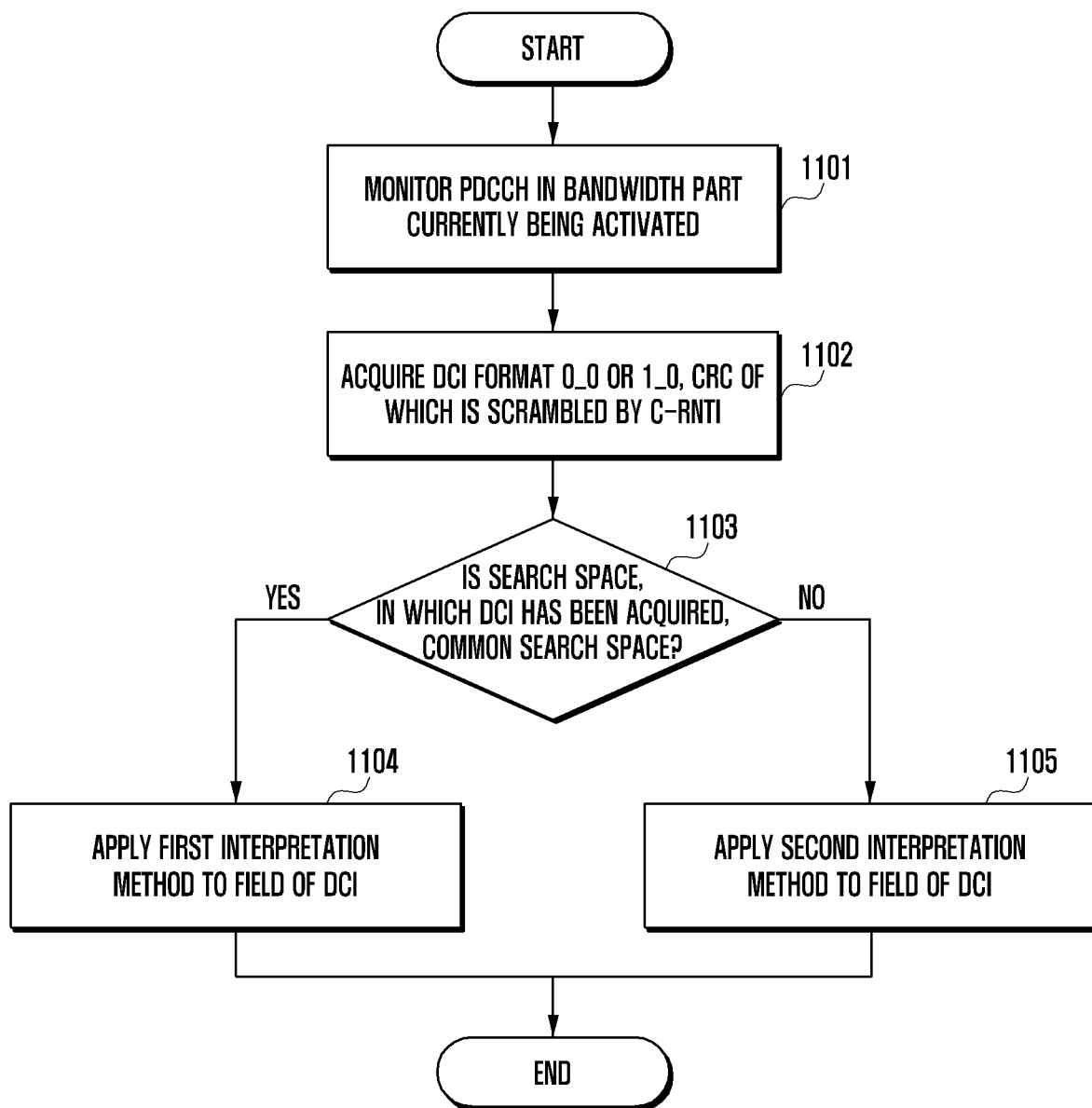
FIG. 11 is flowchart of a terminal procedure, according to embodiment 2-4.

FIG. 11 is a flowchart of a terminal procedure, according to an embodiment.

Referring to FIG. 11, at step 1101, a terminal monitors a PDCCH in a bandwidth part currently being activated. At step 1102, the terminal acquires a DCI format 0_0 or 1_0, a CRC of which is scrambled by a C-RNTI. At step 1103, the terminal determines whether the type of search space, in which the DCI has been acquired at step 1102, is a common search space.

If the type of the search space is determined at step 1103 to be a common search space, at step 1104, the terminal may apply a first interpretation method to a resource allocation field (a frequency-axis resource allocation field, a time-axis resource allocation field, or a frequency/time-axis resource allocation field) of the acquired DCI. The first interpretation method may correspond to Embodiment 2-2 in relation to frequency-axis resource allocation information, and may correspond to Embodiment 2-3 in relation to time-axis resource allocation information.

If the type of the search space is determined at step 1103 not to be a common search space (i.e., if the type of the search space corresponds to a UE-specific search space), at step 1105, the terminal may apply a second interpretation method to the resource allocation field (a frequency-axis resource allocation field, a time-axis resource allocation field, or a frequency/time-axis resource allocation field) of the acquired DCI. The second interpretation method may correspond to a method for determining frequency-axis resource allocation information on the basis of the bandwidth size of the bandwidth part currently being activated, and may correspond to a method for determining time-axis resource allocation information on the basis of a time-axis resource allocation table configured for the bandwidth part currently being activated.

Embodiment 2-5

Figure 12:
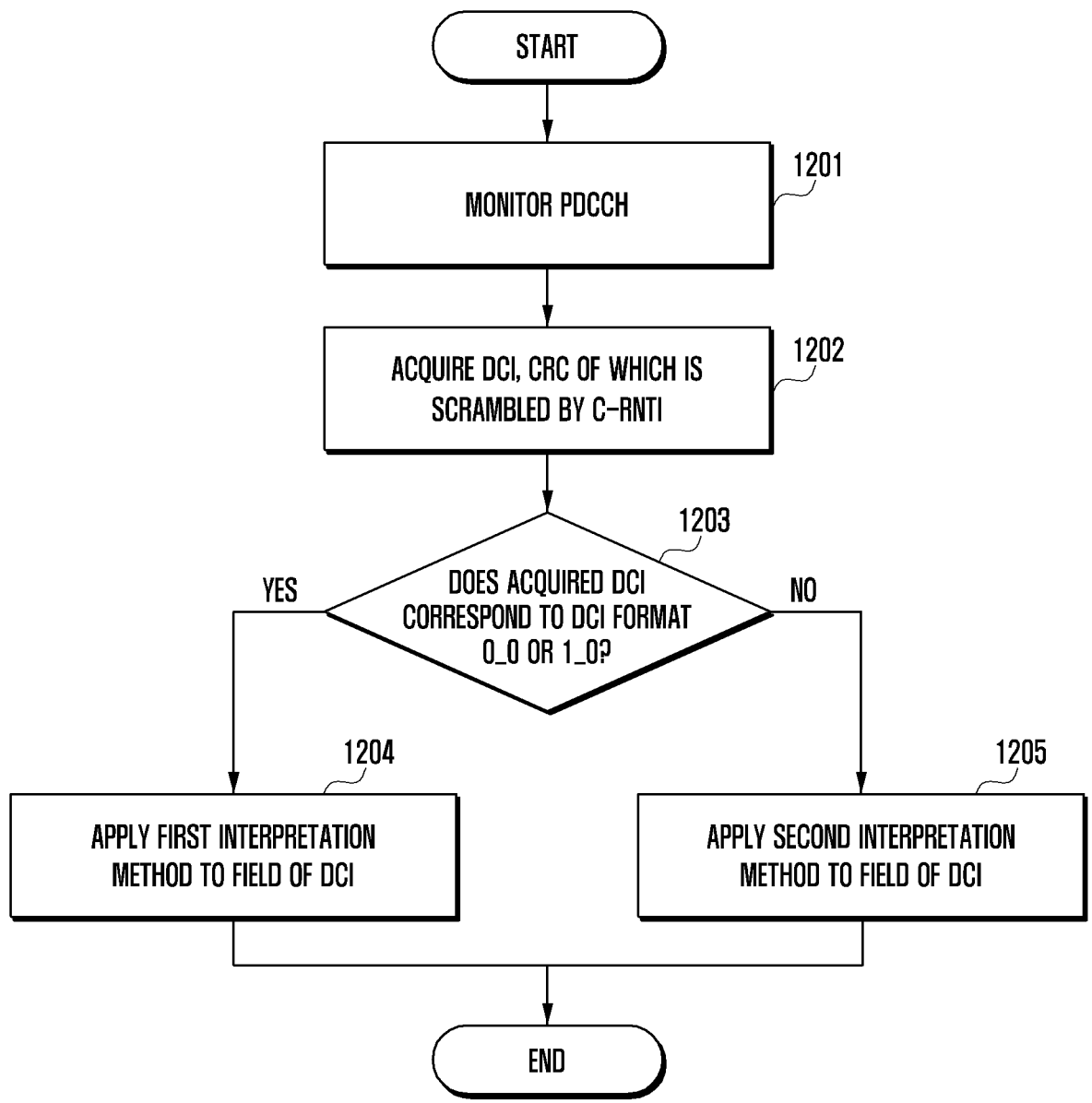
FIG. 12 is flowchart of a terminal procedure, according to embodiment 2-5.

FIG. 12 is a flowchart of a terminal procedure, according to an embodiment.

Referring to FIG. 12, at step 1201, a terminal monitors a PDCCH in a bandwidth part currently being activated. At step 1202, the terminal acquires DCI, a CRC of which is scrambled by a C-RNTI. At step 1203, the terminal determines whether a format of the DCI acquired at step 1202 corresponds to 0_0 or 1_0.

If the format of the DCI is determined at step 1203 to correspond to 0_0 or 1_0, at step 1204, the terminal applies a first interpretation method to a resource allocation field (a frequency-axis resource allocation field, a time-axis resource allocation field, or a frequency/time-axis resource allocation field) of the acquired DCI. The first interpretation method may correspond to Embodiment 2-2 in relation to frequency-axis resource allocation information, and may correspond to Embodiment 2-3 in relation to time-axis resource allocation information.

If the format of the DCI is determined at step 1203 not to correspond to 0_0 or 1_0, at step 1205, the terminal applies a second interpretation method to the resource allocation field (a frequency-axis resource allocation field, a time-axis resource allocation field, or a frequency/time-axis resource allocation field) of the acquired DCI. The second interpretation method may correspond to a method for determining frequency-axis resource allocation information on the basis of the bandwidth size of the bandwidth part currently being activated, and may correspond to a method for determining time-axis resource allocation information on the basis of a time-axis resource allocation table configured for the bandwidth part currently being activated.

Embodiment 2-6

Figure 13:
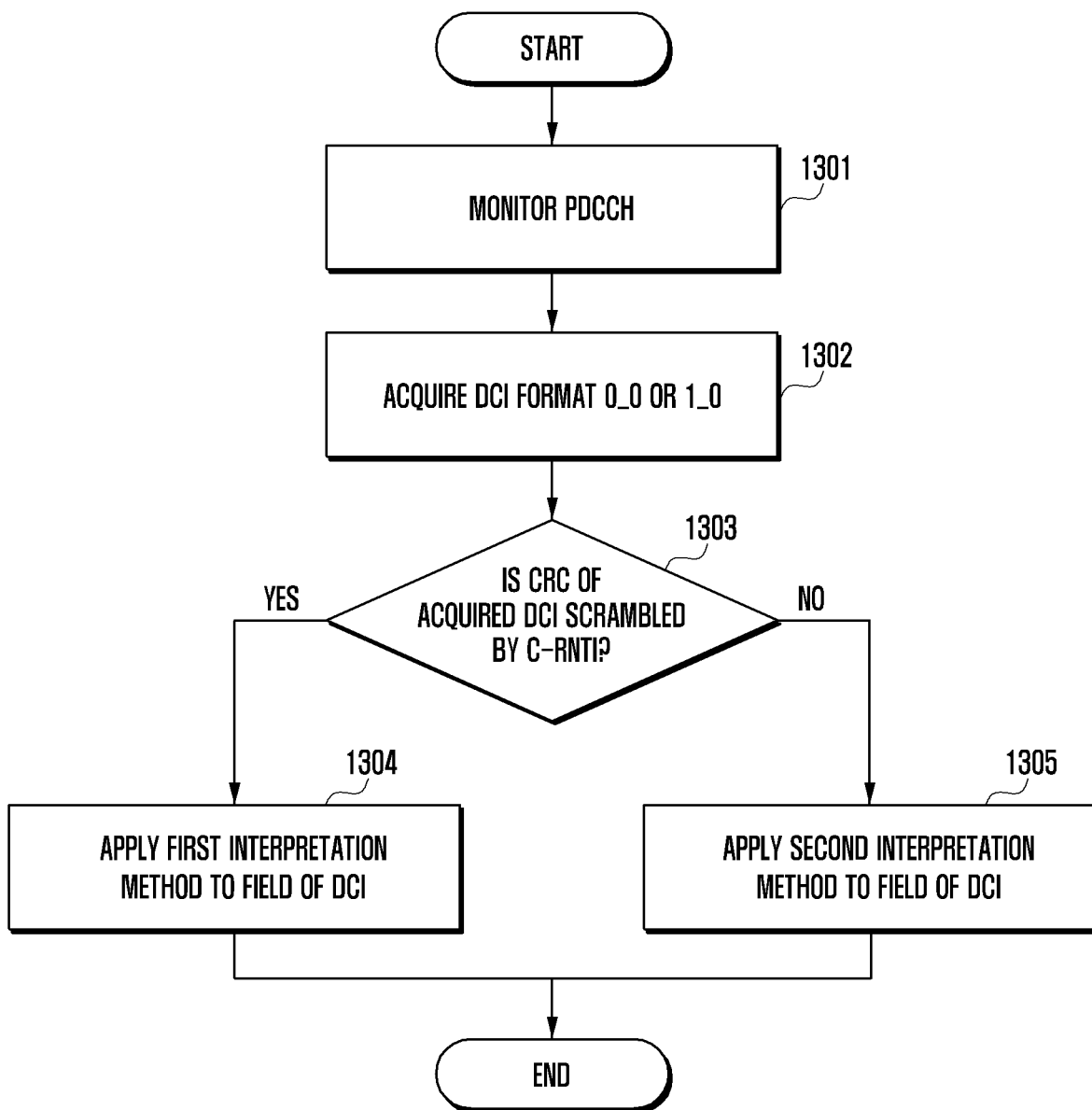
FIG. 13 is flowchart of a terminal procedure, according to embodiment 2-6.

FIG. 13 is a flowchart of a terminal procedure, according to an embodiment.

Referring to FIG. 13, at step 1301, a terminal monitors a PDCCH in a bandwidth part currently being activated. At step 1302, the terminal acquires a DCI format 0_0 or 1_0. At step 1303, the terminal determines whether a CRC of the DCI acquired at step 1302 is scrambled by a C-RNTI.

If the CRC of the acquired DCI format 0_0 or 1_0 is determined at step 1303 to be scrambled by the C-RNTI, at step 1304, the terminal applies a first interpretation method to a resource allocation field (a frequency-axis resource allocation field, a time-axis resource allocation field, or a frequency/time-axis resource allocation field) of the acquired DCI. The first interpretation method may correspond to Embodiment 2-2 in relation to frequency-axis resource allocation information, and may correspond to Embodiment 2-3 in relation to time-axis resource allocation information.

If the CRC of the acquired DCI format 0_0 or 1_0 is determined at step 1303 not to be scrambled by the C-RNTI (i.e., if the CRC thereof is scrambled by an RNTI other than the C-RNTI), at step 1305, the terminal applies a second interpretation method to the resource allocation field (a frequency-axis resource allocation field, a time-axis resource allocation field, or a frequency/time-axis resource allocation field) of the acquired DCI. The second interpretation method may correspond to a method for determining frequency-axis resource allocation information on the basis of the bandwidth size of the bandwidth part currently being activated, and may correspond to a method for determining time-axis resource allocation information on the basis of a time-axis resource allocation table configured for the bandwidth part currently being activated.

Embodiment 2-7

Embodiment 2-7 describes a method for determining a DCI size of a DCI format 2_0 or 2_1.

First, a DCI format 2_0 and a DCI format 2_1 of the 5G system will be briefly described.

A DCI format 2_0 may be transmitted to indicate a slot format to a terminal group. One slot may be configured by a combination of downlink symbols, uplink symbols, and flexible symbols, and a particular combined form may be defined as a slot format. Each of 14 symbols in a slot may be one of a downlink symbol, an uplink symbol, and a flexible symbol. A DCI format 2_0 may be transmitted to indicate which slot format a particular slot has. A CRC of the DCI format 2_0 may be scrambled by an SFI-RNTI. The DCI format 2_0 may include, for example, the following information:

DCI format identifier—[1] bit;
Slot format indicator 1, slot format indicator 2, . . . , and slot format indicator N.

A payload size of the DCI format 2_0 may be configured by higher layer signaling (e.g., RRC signaling), and may be configured up to a maximum of 128 bits.

A DCI format 2_1 may notify a terminal group of a set of symbols and RBs in a particular time and frequency resource domain, and a terminal may assume that no transmission intended for the terminal itself exists in the resource domain indicated by the DCI format 2_1. A CRC of the DCI format 2_1 may be scrambled by an INT-RNTI. The DCI format 2_1 may include the following information:

DCI format identifier—[1] bit;
Pre-emption indicator 1, pre-emption indicator 2, . . . , and pre-emption indicator N.

A payload size of the DCI format 2_1 may be configured by higher layer signaling (e.g., RRC signaling), and may be configured up to a maximum of 126 bits.

Both the DCI format 2_0 and the DCI format 2_1 may be monitored in a common search space.

The terminal may perform blind-decoding for DCI formats having different sizes monitored in the same search space or PDCCH candidate, in which blind-decoding is performed for each DCI format. In contrast, the terminal may perform only one blind-decoding for multiple DCI formats all having the same size monitored in the same search space, and may distinguish between different DCI formats by using an RNTI scrambled to a CRC or a DCI format identifier existing in DCI. Accordingly, different DCI formats to be identical are adjusted to all have the same size, making it possible to effectively reduce the number of times of execution of blind-decoding by the terminal.

For the above described purpose, the 5G system ensures that a DCI format 0_0 always has the same size as that of a DCI format 1_0 so as to reduce the number of times of execution of blind-decoding by a terminal. If a payload size of the DCI format 0_0 is smaller than that of the DCI format 1_0, zeros may be padded to the DCI format 0_0 so that the DCI format 1_0 can have the same size as that of the DCI format 0_0.

In Embodiment 2-7, in a method for determining sizes of a DCI format 2_0 or 2_1, if the DCI format 2_0 or 2_1 has a smaller size than that of a DCI format 0_0/1_0, zeros are padded to the DCI format 2_0 or 2_1 so as to enable the DCI format 2_0 or 2_1 to have the same size as that of the DCI format 0_0/1_0.

The DCI format 2_0 or 2_1 is allowed to have the same size as that of the DCI format 0_0/1_0, and thus, if the DCI format 2_0 or 2_1 and the DCI format 0_0/1_0 are monitored in the same search space or PDCCH candidate, the number of times of execution of blind-decoding can be reduced.

If the DCI format 2_0 or 2_1 has a larger size than that of the DCI format 0_0/1_0, adjustment which allows the DCI format 2_0 or 2_1 to have the same size as that of the DCI format 0_0/1_0 may not be performed. The size configured for the DCI format 2_0 or 2_1 by a base station may be maintained as it is.

Sizes of the DCI format 2_0 and the DCI format 2_1 may be set to a maximum of 128 bits and a maximum of 126 bits, respectively. The purpose of supporting a very large number of bits as described above may be to indicate multiple cells or component carriers in a particular cell. Accordingly, when the DCI format 2_0 or 2_1 has a larger size than that of the DCI format 0_0/1_0, if a part of a payload of the DCI format 2_0 or 2_1 is truncated to allow the DCI format 2_0 or 2_1 to have the same size as that of the DCI format 0_0/1_0, it is possible to limit control information which can be indicated using the DCI format 2_0 or 2_1.

When the DCI format 2_0 or 2_1 has a larger size than that of the DCI format 0_0/1_0, it is not desirable to pad zeros to the DCI format 0_0/1_0 in order to allow relevant pieces of DCI to have the same sizes. Since the DCI format 0_0/1_0 can be used not only to schedule a unicast PDSCH but also to schedule a broadcast PDSCH, the DCI format 0_0/1_0 should be defined to have the size of DCI which is common for all terminals, and thus it is not desirable for the DCI to have a variable size.

Procedures of a base station and a terminal which comply with Embodiment 2-7 will be described below.

If a DCI format 2_0 or 2_1 to be transmitted has a smaller size than that of a DCI format 0_0/1_0, the base station may pad zeros to the DCI format 2_0 or 2_1 so as to cause the DCI format 2_0 or 2_1 to have the same size as that of the DCI format 0_0/1_0, and may then transmit DCI according to the DCI format 2_0 or 2_1. If the DCI format 2_0 or 2_1 to be transmitted has a larger size than that of the DCI format 0_0/1_0, the base station does not change the size of the DCI format 2_0 or 2_1, and may then transmit, as it is, DCI having a size according to the pre-configuration.

If the DCI format 2_0 or 2_1 to be transmitted by the base station has a smaller size than that of the DCI format 0_0/1_0, the terminal may perform blind-decoding on the assumption that zeros are padded to the DCI format 2_0 or 2_1 so as to cause the DCI format 2_0 or 2_1 to have the same size as that of the DCI format 0_0/1_0. If the DCI format 2_0 or 2_1 to be transmitted by the base station has a larger size than that of the DCI format 0_0/1_0, the terminal may perform blind-decoding on the assumption that the DCI format 2_0 or 2_1 has a size according to the pre-configuration.

Embodiment 2-8

A terminal may monitor a DCI format 0_0 or 1_0 with a CRC scrambled by a C-RNTI in a currently-activated bandwidth part in a common search space or a UE-specific search space. A size of a frequency-axis resource allocation field in the DCI format 0_0 or 1_0 may be determined on the basis of the bandwidth of an initial bandwidth part. The terminal may acquire, from the DCI format 0_0 or 1_0, data scheduling information in the currently-activated bandwidth part.

If a bandwidth of the initial bandwidth part is X RB and a bandwidth of the currently-activated bandwidth part is Y RB, the terminal may reinterpret information by using a frequency-axis resource allocation information field in the currently-activated bandwidth part in consideration of a scaling factor Z. The scaling factor Z may be determined by the following methods.

If frequency-axis allocation information is indicated to the terminal by using frequency allocation type 1 described in Table 21, the terminal may reinterpret the frequency-axis allocation information in consideration of the size of an RBG using a scaling factor Z. Frequency allocation type 1 may indicate a start point ($RB_{start}$) of a scheduled data channel and the number of consecutive RBs ($L_{RB}$) thereof. The terminal may reinterpret the start point and the number of consecutive RBs in consideration of the defined scaling factor. The terminal may regard $RB_{start}$ as $RB_{start} \cdot Z$ and may regard $L_{RB}$ as $L_{RB} \cdot Z$ so as to reinterpret frequency allocation information.

The above described method may be identically considered as a method for interpreting frequency-axis allocation information for the currently-activated bandwidth part corresponding to Y RB by using a total of X RBGs, each of which includes Z RBs.

In the following description, a specific method for configuring an RBG and a specific method for determining a scaling factor Z will be proposed.

[Method 11]

As a method for grouping Y RBs into X RBGs, each of the X RBGs may include Z RBs. Z may have the value described below:

Z=ceiling(Y/X) or Z=flooring(Y/X).

Among Y RBs, only Z*X RBs from may be utilized for frequency-axis resource allocation, and a (Y−X*Z) number of RBs are not considered for resource allocation. As a specific example, if Y=25 RBs and X=12 RBs, Z may be 2 RBs and RBs of Y may be regarded as including a total of 12 RBGs, the size of each of which is 2 RBs. Accordingly, in the case of reinterpretation of scheduling information of a bandwidth part having a bandwidth of Y RB representing a bandwidth of the currently-activated bandwidth part by using a frequency-axis field, the size of which has been determined on the basis of the bandwidth X RB of the initial bandwidth part, a part corresponding to (Y−X*Z)=24 RBs among Y=25 RBs may be reinterpreted and scheduled.

The terminal may reinterpret frequency-axis allocation information in consideration of the size of an RBG using the scaling factor Z. When frequency-axis allocation information is indicated to the terminal by using frequency allocation type 1 described in Table 21, frequency allocation type 1 may indicate a start point ($RB_{start}$) of a scheduled data channel and the number of consecutive RBs ($L_{RB}$) thereof. The terminal may reinterpret the start point and the number of consecutive RBs in consideration of the defined scaling factor. The terminal may regard $RB_{start}$ as $RB_{start} \cdot Z$ and may regard $L_{RB}$ as $L_{RB} \cdot Z$ so as to reinterpret frequency allocation information.

[Method 12]

As a method for grouping Y RBs into X RBGs, among the X RBGs, some RBGs may include RBs of a first RBG size Z1 and some other RBGs may include RBs of a second RBG size Z2. Z1 and Z2 may be defined by the equations below, respectively:

Z1=ceiling(Y/X) or flooring(Y/X);

$$Z2 = Y - (X-1)*Z1.$$

An (X−1) number of RBGs may be regarded as an RBGs, each of which includes Z1 RBs, and one last RBG may be regarded as an RBG including Z2 RBs. One last RBG may include the remaining RBs except for an (X−1) number of RBGs, each of which includes Z1 RBs, among all Y RBs. By using the above described method, all of Y RBs may be utilized for frequency-axis resource allocation. Accordingly, when frequency-axis resource allocation is reinterpreted, if scheduling information including RBGs having different sizes is acquired, with respect to the relevant information, instead of simply considering scaling, scheduling information may be reinterpreted in consideration of sizes of RBGs having different sizes. If a frequency-axis field calculated in consideration of X RBs indicates scheduling including an X-th RB, the terminal may regard the X-th RB as having a size of (X−Z*Y) and may reinterpret the X-th RB as frequency-axis allocation information for Y RBs.

As a specific example, if Y=25 RBs and X=12 RBs, Z1 may be 2 RBs, RBs of Y may include a total of 11 RBGs, the size of each of which 2 RBs, and the last RBG may be regarded as having a size of 3 RBs. Accordingly, when scheduling information of a bandwidth part having a bandwidth of Y (=25) RBs is reinterpreted by using a frequency-axis field, the size of which has been determined on the basis of a bandwidth of X (=12) RBs, all the 25 RBs may be utilized for scheduling. A last RBG may be regarded as having a size of Z2 (=3) not Z1 RBs so as to interpret scheduling information, wherein the last RBG corresponds a case in which information is reinterpreted as being scheduled in a state of including the last RBG (e.g., an RBG having a size of 3 RBs).

The terminal may reinterpret frequency-axis allocation information in consideration of the size of an RBG using the scaling factors Z1 and Z2. When frequency-axis allocation information is indicated using frequency allocation type 1 described in Table 21, frequency allocation type 1 may indicate a start point ($RB_{start}$) of a scheduled data channel and the number of consecutive RBs ($L_{RB}$) thereof. The terminal may reinterpret the start point and the number of consecutive RBs in consideration of the defined scaling factor. If an RB index represented by $RB_{start}$ corresponds to 0≤n<X, a frequency-axis resource allocation start point may be interpreted as $RB_{start}$·Z1, and if an RB index represented by $RB_{start}$ corresponds to n=X, a frequency-axis resource allocation start point may be interpreted as $RB_{start}$·Z2. Also, if the number of RBs allocated to the entire frequency-axis is $L_{RB}$, the total number of RBs, an RB index of each of which corresponds to 0≤n<X among $L_{RB}$ RBs is $L_{RB,1}$, and the total number of RBs, an RB index of each of which corresponds to n=X is $L_{RB,2}$, a frequency-axis resource allocation length may be regarded as $L_{RB,1}*Z1+L_{RB,2}*Z2$ and $L_{RB,1}*Z1+L_{RB,2}*Z2$ may be reinterpreted as frequency allocation information for the currently-activated bandwidth part.

[Method 13]

As a method for grouping Y RBs into X RBGs, among the X RBGs, each of N1 RBGs may include RBs of a first RBG size Z1 and each of N2 RBGs may include RBs of a second RBG size Z2. In this example, N1, N2, Z1, Z2 may be defined by equations below, respectively: The number of RBGs having a first RBG size: N1=mod(Y, X);

The number of RBGs having a second RBG size: N2=X−N1;

First RBG size: Z1=ceiling(Y/X);
Second RBG size: Z2=flooring(Y/X);

X=N1+N2.

If an RB index is defined as $n_{RB}$=0, 1, 2, 3, ..., Y−1, and an RBG index is defined as $n_{RBG}$=0, 1, 2, ..., X−1, a relationship between RBGs having the first RBG size and RBs constituting a relevant RBG, and a relationship between RBGs having the second RBG size and RBs constituting a relevant RBG may be defined as follows:

Index of an RBG having a first RBG size: 0≤$n_{RBG}$<N1;
Indices of RBs having the first RBG size: $n_{RBG}*Z1+n_{RB}$, 0≤$n_{RB}$<Z1;
Index of an RBG having a second RBG size: N1≤$n_{RBG}$≤N1+N2;
Indices of RBs having the second RBG size: N1*Z1+($n_{RBG}$−N1)*Z2+$n_{RB}$, 0≤$n_{RB}$<Z2;

As a specific example, if Y (=30) RBs and X (=12) RBs, Z1 (=3) RBs, Z2 (=2) RBs, N1=6, and N2=6. By using the above described method, if Y (=30) RBs are grouped into X (=12) RBGs (e.g., RBG0, RBG1, RBG2, ..., RBG11) among Y (=30) RBs, RB indices of which correspond to n=0, 1, 2, ..., 17, may be grouped by Z1=3 so as to configure a total of 6 RBGs (RBG0, RBG1, RBG2, ..., RBG5), and RBs, RB indices of which correspond to n=18, 19, 20, ..., 29, may be grouped by Z2=2 so as to configure a total of 6 RBGs (RBG6, RBG7, RBG8, ..., RBG11).

The terminal may reinterpret and acquire a frequency-axis resource allocation field in a DCI format 0_0 or 1_0, the size of which has been calculated with reference to a bandwidth X RB of an initial bandwidth part, as data scheduling information of a bandwidth Y RB of a currently-activated bandwidth part. By using the above described method, Y RBs may be grouped into X RBGs, the contents of an n (0≤n<X−1)-th RB in the contents of an frequency-axis resource allocation field indicated with reference to the initial bandwidth part (e.g., X RB), may be mapped one-to-one to the contents of an n (0≤n<X−1)-th RBG in an X RBG, which is based on the currently-activated bandwidth part, so as to be applied. The terminal may apply a scaling factor Z1 to RBs, RB indices of which correspond to 0≤n<N1, in the contents of the frequency-axis resource allocation field indicated with reference to the initial bandwidth part, and thus may reinterpret the relevant contents, and may apply a scaling factor Z2 to RBs, RB indices of which correspond to N1≤n<N1+N2 so as to reinterpret the relevant contents.

When frequency-axis allocation information is indicated using frequency allocation type 1 described in Table 21, frequency allocation type 1 may indicate a start point ($RB_{start}$) of a scheduled data channel and the number of consecutive RBs ($L_{RB}$) thereof. The terminal may reinterpret the start point and the number of consecutive RBs in consideration of the defined scaling factor. If an RB index represented by $RB_{start}$ corresponds to 0≤n<N1, a frequency-axis resource allocation start point may be interpreted as $RB_{start}$·Z1, and if the RB index represented by $RB_{start}$ corresponds to N1 n<N1+N2, the frequency-axis resource allocation start point may be interpreted as $RB_{start}$·Z2. Also, if the number of RBs allocated to the entire frequency axis is $L_{RB}$, the total number of RBs, RB indices of which correspond to 0≤n<N1 among $L_{RB}$ RBs is $L_{RB,1}$, and the total number of RBs, RB indices of which correspond to N1 n<N1+N2 is $L_{RB,2}$, a frequency-axis resource allocation length may be regarded as $L_{RB,1}*Z1+L_{RB,2}*Z2$ so as to reinterpret frequency allocation information.

[Method 14]

As a method for grouping Y RBs into X RBGs, among the X RBGs, each of N1 RBGs may include RBs of a first RBG size Z1 and each of N2 RBGs may include RBs of a second RBG size Z2. In this example, N1, N2, Z1, Z2 may be defined by equations below, respectively:

The number of RBGs having a first RBG size: N1=X−N2;
The number of RBGs having a second RBG size: N2=mod(Y, X);
First RBG size: Z1=flooring(Y/X);
Second RBG size: Z2=ceiling(Y/X);

X=N1+N2.

If an RB index is defined as $n_{RB}$=0, 1, 2, 3, ..., Y−1, and an RBG index is defined as $n_{RBG}$=0, 1, 2, ..., X−1, a relationship between RBGs having the first RBG size and RBs constituting a relevant RBG, and a relationship between RBGs having the second RBG size and RBs constituting a relevant RBG may be defined as follows:

Index of an RBG having a first RBG size: $0 \leq n_{RBG} < N1$;
Indices of RBs having the first RBG size: $n_{RBG}*Z1+n_{RB}$, $0 \leq n_{RB} < Z1$;
Index of an RBG having a second RBG size: $N1 \leq n_{RBG} \leq N1+N2$;
Indices of RBs having the second RBG size: $N1*Z1+(n_{RBG}-N1)*Z2+n_{RB}$, $0 \leq n_{RB} < Z2$.

As a specific example, if Y (=30) RBs and X (=12) RBs, Z1 (=2) RBs, Z2 (=3) RBs, N1=6, and N2=6. By using the above described method, if Y (=30) RBs are grouped into X (=12) RBGs (e.g., RBG0, RBG1, RBG2, . . . , RBG11) among Y (=30) RBs, RB indices of which correspond to n=0, 1, 2, . . . , 17, may be grouped by Z1=2 so as to configure a total of 6 RBGs (RBG0, RBG1, RBG2, . . . , RBG5), and RBs, RB indices of which correspond to n=18, 19, 20, . . . , 29, may be grouped by Z2=3 so as to configure a total of 6 RBGs (RBG6, RBG7, RBG8, . . . , RBG11).

The terminal may reinterpret and acquire a frequency-axis resource allocation field in a DCI format 0_0 or 1_0, the size of which has been calculated with reference to a bandwidth X RB of an initial bandwidth part, as data scheduling information of a bandwidth Y RB of a currently-activated bandwidth part. By using the above described method, Y RBs may be grouped into X RBGs, the contents of an n ($0 \leq n < X-1$)-th RB in the contents of an frequency-axis resource allocation field indicated with reference to the initial bandwidth part (e.g., X RB), may be mapped one-to-one to the contents of an n ($0 \leq n < X-1$)-th RBG in an X RBG, which is based on the currently-activated bandwidth part, so as to be applied. The terminal may apply a scaling factor Z1 to RBs, RB indices of which correspond to $0 \leq n < N1$, in the contents of the frequency-axis resource allocation field indicated with reference to the initial bandwidth part, and thus may reinterpret the relevant contents, and may apply a scaling factor Z2 to RBs, RB indices of which correspond to $N1 \leq n < N1+N2$ so as to reinterpret the relevant contents.

When frequency-axis allocation information is indicated using frequency allocation type 1 described in Table 21, frequency allocation type 1 may indicate a start point ($RB_{start}$) of a scheduled data channel and the number of consecutive RBs ($L_{RB}$) thereof. The terminal may reinterpret the start point and the number of consecutive RBs in consideration of the defined scaling factor. If an RB index represented by $RB_{start}$ corresponds to $0 \leq n < N1$, a frequency-axis resource allocation start point may be interpreted as $RB_{start} \cdot Z1$, and if the RB index represented by $RB_{start}$ corresponds to $N1 \; n < N1+N2$, the frequency-axis resource allocation start point may be interpreted as $RB_{start} \cdot Z2$. Also, if the number of RBs allocated to the entire frequency axis is $L_{RB}$, the total number of RBs, RB indices of which correspond to $0 \leq n < N1$ among $L_{RB}$ RBs, is $L_{RB,1}$, and the total number of RBs, RB indices of which correspond to $N1 \leq n < N1+N2$ is $L_{RB,2}$, a frequency-axis resource allocation length may be regarded as $L_{RB,1}*Z1+L_{RB,2}*Z2$ so as to reinterpret frequency allocation information.

Embodiment 2-9

A terminal may receive one or more configured bandwidth parts from a base station.

The terminal may assume the size of a DCI format 0_1 or 1_1 on the basis of configuration information of a bandwidth part currently being activated.

If a bandwidth part indicator transmitted using DCI indicates a bandwidth part other than the bandwidth part currently being activated, this configuration may signify scheduling information of the indicated bandwidth part.

When the terminal has received the DCI format 0_1 and a bandwidth part indicator of the received DCI indicates a bandwidth part other than the bandwidth part currently being activated, the terminal may regard all fields (however, a carrier indicator, a UL/SUL indicator, and a bandwidth part indicator existing in the DCI format 0_1 are maintained without any change) of the received DCI as being the same as those in fallback DCI (e.g., a DCI format 0_0) so as to interpret the fields. If a bandwidth part indicator indicates another bandwidth part, the received DCI format 0_1 may be considered and interpreted as shown in Table 22 below:

TABLE 22

Carrier indicator - 0 or 3 bits
UL/SUL indicator - 1 bit
Identifier for DCI formats - 1 bit
Bandwidth part indicator - 0, 1 or 2 bits
Frequency domain resource assignment - $[\lceil \log_2(N_{RB}^{UL,BWP}(N_{RB}^{UL,BWP} + 1)/2)\rceil]$ bits
Time domain resource assignment - 4 bits
Frequency hopping flag - 1 bit.
Modulation and coding scheme - 5 bits
New data indicator - 1 bit
Redundancy version - 2 bits
HARQ process number - 4 bits
TPC command for scheduled PUSCH - 2 bits When the terminal has received the DCI format 1_1 and a bandwidth part indicator of the received DCI indicates a bandwidth part other than the bandwidth part currently being activated, the terminal may regard all fields (however, a carrier indicator and a bandwidth part indicator existing in the DCI format 1_1 are maintained without any change) of the received DCI as being the same as those in fallback DCI (e.g., a DCI format 1_0) so as to interpret the fields. If a bandwidth part indicator indicates another bandwidth part, the received DCI format 1_1 may be considered and interpreted as shown in Table 23 below:

TABLE 23

Carrier indicator - 0 or 3 bits
Identifier for DCI formats - 1 bit
Bandwidth part indicator - 0, 1 or 2 bits
Frequency domain resource assignment - $[\lceil \log_2(N_{RB}^{DL,BWP}(N_{RB}^{DL,BWP} + 1)/2)\rceil]$ bits
Time domain resource assignment - 4 bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - 2 bits
PUCCH resource indicator - 3 bits
PDSCH-to-HARQ feedback timing indicator - 3 bits Embodiment 2-10

A terminal may receive one or more configured bandwidth parts from a base station.

The terminal may assume the size of a DCI format 0_1 or 1_1 on the basis of configuration information of a bandwidth part currently being activated.

If a bandwidth part indicator transmitted using DCI indicates a bandwidth part other than the bandwidth part currently being activated, this configuration may signify scheduling information of the indicated bandwidth part.

If a currently-activated bandwidth part is A, a bandwidth part indicated by a bandwidth part indicator is B, a bandwidth of bandwidth part A is X RB, a bandwidth of bandwidth part B is Y RB, and bandwidth part A has a smaller bandwidth than that of bandwidth part B, the reinterpretation method described below may be applied to DCI field which indicates frequency-axis resource allocation information.

The terminal may group Y RB of bandwidth part B into a total of X RBGs so as to consider the X RBGs, and may further consider indices of the grouped X RBGs together with indices of X RB of bandwidth part A. First, as a method for grouping Y RB into X RBGs, methods identical to Method 11, Method 12, Method 13, and Method 14 of Embodiment 2-8 may be considered (in each method, an initial bandwidth part and a currently-activated bandwidth part may be replaced by bandwidth part A and bandwidth part B, respectively, which allows identical application). Method 13 may be considered as follows:

[Reinterpretation Method]

As a method for grouping Y RBs into X RBGs, among the X RBGs, each of N1 RBGs may include RBs of a first RBG size Z1 and each of N2 RBGs may include RBs of a second RBG size Z2. In this example, N1, N2, Z1, Z2 may be defined by equations below, respectively:

The number of RBGs having a first RBG size: N1=mod (Y, X);

The number of RBGs having a second RBG size: N2=X−N1;

First RBG size: Z1=ceiling(Y/X);

Second RBG size: Z2=flooring(Y/X);

$X=N1+N2$.

If an RB index is defined as $n_{RB}=0, 1, 2, 3, \ldots, Y-1$, and an RBG index is defined as $n_{RBG}=0, 1, 2, \ldots, X-1$, a relationship between RBGs having the first RBG size and RBs constituting a relevant RBG, and a relationship between RBGs having the second RBG size and RBs constituting a relevant RBG may be defined as follows:

Index of an RBG having a first RBG size: $0 \leq n_{RBG} < N1$;

Indices of RBs having the first RBG size: $n_{RBG}*Z1+n_{RB}$, $0 \leq n_{RB} < Z1$;

Index of an RBG having a second RBG size: $N1 \leq n_{RBG} \leq N1+N2$;

Indices of RBs having the second RBG size: $N1*Z1+(n_{RBG}-N1)*Z2+n_{RB}$, $0 \leq n_{RB} < Z2$.

As a specific example, if Y (=30) RBs and X (=12) RBs, Z1 (=3) RBs, Z2 (=2) RBs, N1=6, and N2=6. By using the above described method, if Y (=30) RBs are grouped into X (=12) RBGs (e.g., RBG0, RBG1, RBG2, . . . , RBG11) among Y (=30) RBs, RB indices of which correspond to n=0, 1, 2, . . . , 17, may be grouped by Z1=3 so as to configure a total of 6 RBGs (RBG0, RBG1, RBG2, . . . , RBG5), and RBs, RB indices of which correspond to n=18, 19, 20, . . . , 29, may be grouped by Z2=2 so as to configure a total of 6 RBGs (RBG6, RBG7, RBG8, . . . , RBG11).

The terminal may reinterpret and acquire a frequency-axis resource allocation field in a DCI format 0_1 or 1_1, the size of which has been calculated with reference to a bandwidth X RB of bandwidth part A, as data scheduling information of a bandwidth Y RB of bandwidth part B. By using the above described method, Y RBs may be grouped into X RBGs, the contents of an n (0≤n<X−1)-th RB in the contents of an frequency-axis resource allocation field indicated with reference to bandwidth part A (e.g., X RB) may be mapped one-to-one to the contents of an n (0≤n<X−1)-th RBG in an X RBG, which is based on bandwidth part B, so as to be applied. The terminal may apply a scaling factor Z1 to RBs, RB indices of which correspond to 0≤n<N1, in the contents of the frequency-axis resource allocation field indicated with reference to bandwidth part A, and thus may reinterpret the relevant contents, and may apply a scaling factor Z2 to RBs, RB indices of which correspond to N1≤n<N1+N2 so as to reinterpret the relevant contents.

When frequency-axis allocation information is indicated using frequency allocation type 0, an RBG index of bandwidth part B may be mapped one-to-one to an RB index of bandwidth part A so as to be identically considered, and frequency allocation information may be reinterpreted.

When frequency-axis allocation information is indicated using frequency allocation type 1 described in Table 21, frequency allocation type 1 may indicate a start point ($RB_{start}$) of a scheduled data channel and the number of consecutive RBs ($L_{RB}$) thereof. The terminal may reinterpret the start point and the number of consecutive RBs in consideration of the defined scaling factor. If an RB index represented by $RB_{start}$ corresponds to 0≤n<N1, a frequency-axis resource allocation start point may be interpreted as $RB_{start} \cdot Z1$, and if the RB index represented by $RB_{start}$ corresponds to N1≤n<N1+N2, the frequency-axis resource allocation start point may be interpreted as $RB_{start} \cdot Z2$. Also, if the number of RBs allocated to the entire frequency axis is $L_{RB}$, the total number of RBs, RB indices of which correspond to 0≤n<N1 among $L_{RB}$ RBs is $L_{RB,1}$, and the total number of RBs, RB indices of which correspond to N1 n<N1+N2 is $L_{RB,2}$, a frequency-axis resource allocation length may be regarded as $L_{RB,1}*Z1+L_{RB,2}*Z2$ so as to reinterpret frequency allocation information.

ceiling(N) is defined as a function which returns the smallest integer value that is greater than N. flooring(N) is defined as a function which returns the largest integer value that is less than N.

Figure 14:
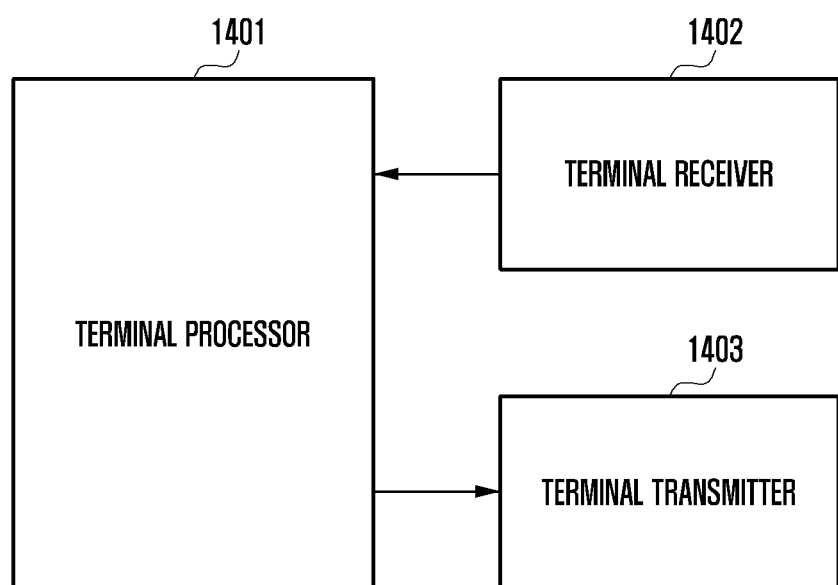
FIG. 14 is a diagram of an internal configuration of a terminal, according to an embodiment.
Figure 15:
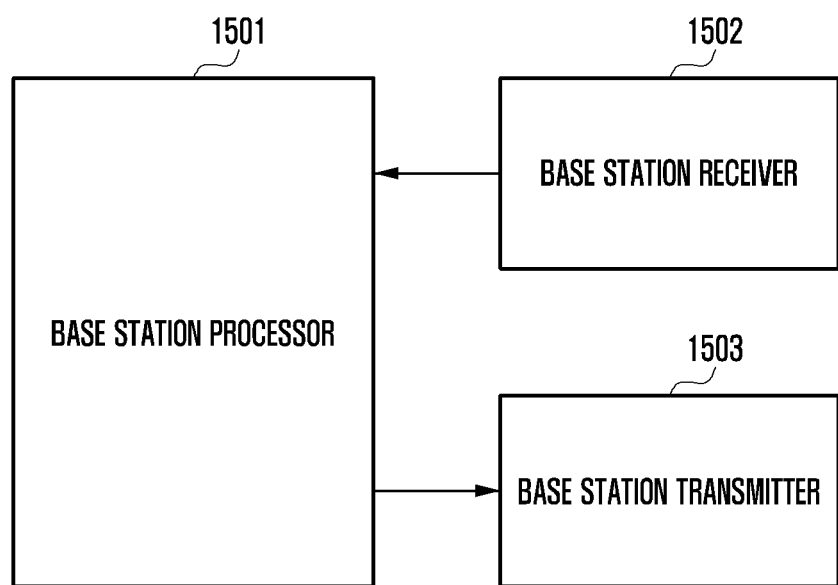
FIG. 15 is a diagram illustrating an internal configuration of a base station, according to an embodiment.

FIG. 14 illustrates a transmitter, a receiver, and a controller which perform the above described embodiments in a terminal, and FIG. 15 illustrates a transmitter, a receiver, and a controller which perform the above described embodiments in a base station. More specifically, FIGS. 14 and 15 illustrate a transmission/reception method between the base station and the terminal for implementing a method for transmitting or receiving a downlink control channel and downlink control information in a 5G communication system according to the above described embodiments, and in order to perform the transmission/reception method, a transmitter, a receiver, and a processor of each of the base station and the terminal need to operate according to the embodiments.

FIG. 14 is a diagram of an internal configuration of a terminal, according to an embodiment.

Referring to FIG. 14, the terminal includes a terminal processor 1401, a terminal receiver 1402, and a terminal transmitter 1403.

The terminal processor 1401 may be configured to control a series of processes so that the terminal can operate according to the above described embodiments. The terminal processor 1401 may be configured to differently control a method for selecting a search space related to a downlink control channel and a method for reinterpreting downlink control information according to embodiments. The terminal processor 1401 may be referred to as a "controller". The terminal processor 1401 may include at least one processor.

The terminal receiver 1402 and the terminal transmitter 1403 may be collectively referred to as a "transceiver". The transceiver may be configured to transmit or receive a signal to or from a base station. The signal may include control information and data. To this end, the transceiver may include an RF transmitter configured to up-convert and amplify a frequency of the transmitted signal, an RF receiver configured to low-noise-amplify the received signal and down-convert the frequency, and the like. Also, the transceiver may be configured to receive a signal through a radio channel and output the received signal to the terminal processor 1401, and may be configured to transmit a signal output from the terminal processor 1401 through a radio channel.

FIG. 15 is a diagram of an internal configuration of a base station, according to an embodiment.

Referring to FIG. 15, the base station includes a base station processor 1501, a base station receiver 1502, and a base station transmitter 1503.

The base station processor 1501 may control a series of processes so that the base station can operate according to the above described embodiments. The base station processor 1501 may be configured to differently control a method for selecting a search space related to a downlink control channel and a method for transmitting downlink control information according to embodiments. The base station processor 1501 may be referred to as a "controller". The base station processor 1501 may include at least one processor.

The base station receiver 1502 and the base station transmitter 1503 may be collectively referred to as a "transceiver". The transceiver may be configured to transmit or receive a signal to or from the terminal. The signal may include control information and data. To this end, the transceiver may include an RF transmitter configured to up-convert and amplify a frequency of the transmitted signal, an RF receiver configured to low-noise-amplify the received signal and down-convert the frequency, and the like. Also, the transceiver may be configured to receive a signal through a radio channel and output the received signal to the base station processor 1501, and may be configured to transmit a signal output from the base station processor 1501 through a radio channel.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for receiving downlink control information (DCI) in a communication system, the method comprising:
identifying an initial bandwidth part based on a master information block received on a physical broadcast channel, wherein the initial bandwidth part is identified based on a control resource set for a system information block indicated by the master information block;
receiving resource allocation information of type 1 indicating an allocated resource, on DCI of DCI format 1_0;
identifying a starting resource block of the allocated resource associated with an active bandwidth part, wherein a starting resource block associated with the initial bandwidth part is based on the starting resource block of the allocated resource associated with the active bandwidth part and a scaling factor determined based on a size of the initial bandwidth part and a size of the active bandwidth part, in case that a size for the DCI of DCI format 1_0 in a user equipment (UE) specific search space (USS) is derived from the size of the initial bandwidth part and the DCI of DCI format 1_0 is applied to the active bandwidth part; and
identifying a length of contiguously allocated resource blocks of the allocated resource associated with the active bandwidth part, wherein a length contiguously allocated resource blocks associated with the initial bandwidth part is based on the length of contiguously allocated resource blocks of the allocated resource associated with the active bandwidth part and the scaling factor, in case that the size for the DCI of DCI format 1_0 in the USS is derived from the size of the initial bandwidth part and the DCI of DCI format 1_0 is applied to the active bandwidth part.

2. The method of claim 1, wherein the scaling factor is determined based on a ratio of the size of the active bandwidth part to the size of the initial bandwidth part.

3. The method of claim 1, wherein the resource allocation information of type 1 comprises of a resource indication value, and wherein the resource indication value corresponds to a starting resource block and a length of contiguously allocated resource blocks.

4. The method of claim 3, wherein the resource allocation information of type 1 indicates to a scheduled UE a set of contiguously allocated resource blocks within the size of the active bandwidth part, except when the DCI of DCI format 1_0 is decoded in a common search space (CSS).

5. The method of claim 4, wherein in case that the DCI of DCI format 1_0 is decoded in the CSS, the size of the initial bandwidth part is used for the size of the DCI format 1_0.

6. A method for transmitting downlink control information (DCI) in a communication system, the method comprising:

transmitting a master information block on a physical broadcast channel, wherein an initial bandwidth part is identified based on a control resource set for a system information block indicated by the master information block;

obtaining resource allocation information of type 1 for indicating an allocated resource; and transmitting the resource allocation information of type 1 on DCI of DCI format 1_0, wherein a starting resource block associated with the initial bandwidth part is identified based on a starting resource block of the allocated resource associated with an active bandwidth part and a scaling factor determined based on a size of the initial bandwidth part and a size of the active bandwidth part, in case that a size for the DCI of DCI format 1_0 in a user equipment (UE) specific search space (USS) is derived from the size of the initial bandwidth part and the DCI of DCI format 1_0 is applied to the active bandwidth part, and wherein a length of contiguously allocated resource blocks associated with the initial bandwidth part is identified based on a length contiguously allocated resource blocks of the allocated resource associated with the active bandwidth part and the scaling factor, in case that the size for the DCI of DCI format 1_0 in the USS is derived from the size of the initial bandwidth part and the DCI of DCI format 1_0 is applied to the active bandwidth part.

7. The method of claim 6, wherein the scaling factor is determined based on a ratio of the size of the active bandwidth part to the size of the initial bandwidth part.

8. The method of claim 6, wherein the resource allocation information of type 1 comprises of a resource indication value, and wherein the resource indication value corresponds to a starting resource block and a length of contiguously allocated resource blocks.

9. The method of claim 8, wherein the resource allocation information of type 1 indicates to a scheduled UE a set of contiguously allocated resource blocks within the size of the active bandwidth part, except when the DCI of DCI format 1_0 is transmitted in a common search space (CSS).

10. The method of claim 9, wherein in case that the DCI of DCI format 1_0 is transmitted in the CSS, the size of the initial bandwidth part is used for the size of the DCI format 1_0.

11. A user equipment (UE) for receiving downlink control information (DCI) in a communication system, the UE comprising:

a transceiver; and a controller coupled with the transceiver and configured to:

identify an initial bandwidth part based on a master information block received on a physical broadcast channel, wherein the initial bandwidth part is identified based on a control resource set for a system information block indicated by the master information block, receive resource allocation information of type 1 indicating an allocated resource, on DCI of DCI format 1_0, identify a starting resource block of the allocated resource associated with an active bandwidth part, wherein a starting resource block associated with the initial bandwidth part is based on the starting resource block of the allocated resource associated with the active bandwidth part and a scaling factor determined based on a size of the initial bandwidth part and a size of the active bandwidth part, in case that a size for the DCI of DCI format 1_0 in a user equipment (UE) specific search space (USS) is derived from the size of the initial bandwidth part and the DCI of DCI format 1_0 is applied to the active bandwidth part, and identify a length of contiguously allocated resource blocks of the allocated resource associated with the active bandwidth part, wherein a length contiguously allocated resource blocks associated with the initial bandwidth part is based on the length of contiguously allocated resource blocks of the allocated resource associated with the active bandwidth part and the scaling factor, in case that the size for the DCI of DCI format 1_0 in the USS is derived from the size of the initial bandwidth part and the DCI of DCI format 1_0 is applied to the active bandwidth part.

12. The UE of claim 11, wherein the scaling factor is determined based on a ratio of the size of the active bandwidth part to the size of the initial bandwidth part.

13. The UE of claim 11, wherein the resource allocation information of type 1 comprises of a resource indication value, and wherein the resource indication value corresponds to a starting resource block and a length of contiguously allocated resource blocks.

14. The UE of claim 13, wherein the resource allocation information of type 1 indicates to a scheduled UE a set of contiguously allocated resource blocks within the size of the active bandwidth part, except when the DCI of DCI format 1_0 is decoded in a common search space (CSS).

15. The UE of claim 14, wherein in case that the DCI of DCI format 1_0 is decoded in the CSS, the size of the initial bandwidth part is used for the size of the DCI format 1_0.

16. A base station for transmitting downlink control information (DCI) in a communication system, the base station comprising:

a transceiver; and a controller coupled with the transceiver and configured to:

transmit a master information block on a physical broadcast channel, wherein an initial bandwidth part is identified based on a control resource set for a system information block indicated by the master information block, obtain resource allocation information of type 1 for indicating an allocated resource, and transmit the resource allocation information of type 1 on DCI of DCI format 1_0,
wherein a starting resource block associated with the initial bandwidth part is identified based on a starting resource block of the allocated resource associated with an active bandwidth part and a scaling factor determined based on a size of the initial bandwidth part and a size of the active bandwidth part, in case that a size for the DCI of DCI format 1_0 in a user equipment (UE) specific search space (USS) is derived from the size of the initial bandwidth part and the DCI of DCI format 1_0 is applied to the active bandwidth part, and
wherein a length of contiguously allocated resource blocks associated with the initial bandwidth part is identified based on a length contiguously allocated resource blocks of the allocated resource associated with the active bandwidth part and the scaling factor, in case that the size for the DCI of DCI format 1_0 in the USS is derived from the size of the initial bandwidth part and the DCI of DCI format 1_0 is applied to the active bandwidth part.

17. The base station of claim 16, wherein the scaling factor is determined based on a ratio of the size of the active bandwidth part to the size of the initial bandwidth part.

18. The base station of claim 16, wherein the resource allocation information of type 1 comprises of a resource indication value, and
wherein the resource indication value corresponds to a starting resource block and a length of contiguously allocated resource blocks.

19. The base station of claim 18, wherein the resource allocation information of type 1 indicates to a scheduled UE a set of contiguously allocated resource blocks within the size of the active bandwidth part, except when the DCI of DCI format 1_0 is transmitted in a common search space (CSS).

20. The base station of claim 19, wherein in case that the DCI of DCI format 1_0 is transmitted in the CSS, the size of the initial bandwidth part is used for the size of the DCI format 1_0.

* * * * *